United States Patent
Xu et al.

(10) Patent No.: US 11,736,223 B2
(45) Date of Patent: Aug. 22, 2023

(54) COMMUNICATION METHOD, COMMUNICATIONS DEVICE, AND STORAGE MEDIUM

(71) Applicant: HUAWEI TECHNOLOGIES CO., LTD., Guangdong (CN)

(72) Inventors: Li Xu, Shenzhen (CN); Qiwen Zhong, Shenzhen (CN); Rixin Li, Dongguan (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/689,384

(22) Filed: Mar. 8, 2022

(65) Prior Publication Data

US 2022/0190953 A1   Jun. 16, 2022

Related U.S. Application Data

(63) Continuation of application No. PCT/CN2020/096433, filed on Jun. 16, 2020.

(30) Foreign Application Priority Data

Sep. 9, 2019 (CN) .......................... 201910849407.4

(51) Int. Cl.
  *H04L 1/00* (2006.01)
  *H04W 76/18* (2018.01)
(52) U.S. Cl.
  CPC .......... *H04L 1/0014* (2013.01); *H04L 1/0008* (2013.01); *H04L 1/0009* (2013.01); *H04W 76/18* (2018.02)
(58) Field of Classification Search
  None
  See application file for complete search history.

(56) References Cited

U.S. PATENT DOCUMENTS

| 6,079,041 A * | 6/2000 | Kunisa ................. H03M 5/145 370/335 |
| 10,739,996 B1 * | 8/2020 | Ebsen ................. G06F 16/1727 |

(Continued)

FOREIGN PATENT DOCUMENTS

| CN | 102195750 A | 9/2011 |
| CN | 109951896 A | 6/2019 |

(Continued)

OTHER PUBLICATIONS

IEEE Std 802.3-2018, IEEE Standard for Ethernet LAN/MAN Standards Committee of the, IEEE Computer Society, Approved Jun. 14, 2018, total 5600 pages.

(Continued)

*Primary Examiner* — Mujtaba M Chaudry
(74) *Attorney, Agent, or Firm* — Womble Bond Dickinson (US) LLP

(57) ABSTRACT

Embodiments of this application provide a communication method, a communications device, and a storage medium, to process an invalid block in a data stream. In embodiments of this application, N first block streams are obtained, where N is a positive integer. When there is an invalid block in the N first block streams, the invalid block in the N first block streams is converted into a target block, to obtain a to-be-sent block stream. Then, the to-be-sent block stream is sent. Because the invalid block in the block stream is checked and converted into the target block, an error that occurs in service data at a receive end and that is caused by the invalid block can be reduced.

20 Claims, 24 Drawing Sheets

(56) References Cited

U.S. PATENT DOCUMENTS

| | | | |
|---|---|---|---|
| 2012/0047548 A1* | 2/2012 | Rowlands | H04N 21/23805 725/142 |
| 2014/0040616 A1* | 2/2014 | Barber | H04N 21/4331 713/168 |
| 2015/0149690 A1* | 5/2015 | Maeda | G06F 3/0679 711/102 |
| 2016/0378499 A1* | 12/2016 | Burger | G06F 9/322 712/234 |

FOREIGN PATENT DOCUMENTS

| | | |
|---|---|---|
| EP | 2365657 A1 | 9/2011 |
| EP | 3691194 A1 | 8/2020 |
| WO | 2017040580 A1 | 3/2017 |
| WO | 2019080813 A1 | 5/2019 |

OTHER PUBLICATIONS

Jean-Michel Caia Fiberhome PR China, "25G and 50G OTN frame format, bit rate and multiplexing scheme proposal", SG15-C.904, ITU-T Draft; Study Period 2017-2020; Study Group 15; Series C.904, International Telecommunication Union, Geneva ; CH vol. 11/15, Sep. 25, 2018 (Sep. 25, 2018), pp. 1-14, XP044251201.

\* cited by examiner

| Input data (Input data) | Synchronization header | 64-bit block payload (Block payload) | | | | | | | |
|---|---|---|---|---|---|---|---|---|---|
| Bit position | | 2 | | | | | | | 65 |
| Data block format | | | | | | | | | |
| $D_0D_1D_2D_3D_4D_5D_6D_7$ | 01 | $D_0$ | $D_1$ | $D_2$ | $D_3$ | $D_4$ | $D_5$ | $D_6$ | $D_7$ |
| Control block format | | Block type area | | | | | | | |
| $C_0C_1C_2C_3C_4C_5C_6C_7$ | 10 | 0x1E | $C_0$ | $C_1$ | $C_2$ | $C_3$ | $C_4$ | $C_5$ | $C_6$ | $C_7$ |
| $S_0D_1D_2D_3D_4D_5D_6D_7$ | 10 | 0x78 | $D_1$ | $D_2$ | $D_3$ | $D_4$ | $D_5$ | $D_6$ | $D_7$ |
| $O_0D_1D_2D_3Z_4Z_5Z_6Z_7$ | 10 | 0x4B | $D_1$ | $D_2$ | $D_3$ | | | | $C_7$ |
| $T_0C_1C_2C_3C_4C_5C_6C_7$ | 10 | 0x87 | | $C_1$ | $C_2$ | $C_3$ | $C_4$ | $C_5$ | $C_6$ | $C_7$ |
| $D_0T_1C_2C_3C_4C_5C_6C_7$ | 10 | 0x99 | $D_0$ | | $C_2$ | $C_3$ | $C_4$ | $C_5$ | $C_6$ | $C_7$ |
| $D_0D_1T_2C_3C_4C_5C_6C_7$ | 10 | 0xAA | $D_0$ | $D_1$ | | $C_3$ | $C_4$ | $C_5$ | $C_6$ | $C_7$ |
| $D_0D_1D_2T_3C_4C_5C_6C_7$ | 10 | 0xB4 | $D_0$ | $D_1$ | $D_2$ | | $C_4$ | $C_5$ | $C_6$ | $C_7$ |
| $D_0D_1D_2D_3T_4C_5C_6C_7$ | 10 | 0xCC | $D_0$ | $D_1$ | $D_2$ | $D_3$ | | $C_5$ | $C_6$ | $C_7$ |
| $D_0D_1D_2D_3D_4T_5C_6C_7$ | 10 | 0xD2 | $D_0$ | $D_1$ | $D_2$ | $D_3$ | $D_4$ | | $C_6$ | $C_7$ |
| $D_0D_1D_2D_3D_4D_5T_6C_7$ | 10 | 0xE1 | $D_0$ | $D_1$ | $D_2$ | $D_3$ | $D_4$ | $D_5$ | | $C_7$ |
| $D_0D_1D_2D_3D_4D_5D_6T_7$ | 10 | 0xFF | $D_0$ | $D_1$ | $D_2$ | $D_3$ | $D_4$ | $D_5$ | $D_6$ | |

| 0 1 2 3 4 5 6 7 8 9 | 0 1 2 3 4 5 6 7 8 9 0 1 2 3 4 5 | 6 7 8 9 0 1 2 3 4 5 | 6 7 8 9 0 1 2 3 4 5 | 6 7 8 9 0 1 2 3 4 5 | 6 7 8 9 0 1 2 3 4 5 | 6 7 8 9 0 1 2 3 4 5 |
|---|---|---|---|---|---|---|
| 1 0 | 0x1E | /E/ (0x1E) | /E/ (0x1E) | /E/ (0x1E) | /E/ (0x1E) | /E/ (0x1E) |

| | 0 1 2 3 4 5 6 7 8 9 | 0 1 2 3 4 5 6 7 8 9 | 0 1 2 3 4 5 6 7 8 9 | 0 1 2 3 4 5 6 7 8 9 | 0 1 2 3 4 5 |
|---|---|---|---|---|---|
| 1 0 | 0x1E | /LI/ (0x06) | /LI/ (0x06) | /LI/ (0x06) | /LI/ (0x06) | /LI/ (0x06) | /LI/ (0x06) |

CONT.
FROM
FIG. 7b-2

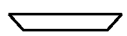 : A solid trapezoid in the figure indicates that the module has an adaptation function, the trapezoid indicates adaptation in English, and for a specific definition, refer to ITU-T G.805/ITU-T G.800

 : A dashed trapezoid in the figure indicates that the module has at least an adaptation function, and may further include another function, the trapezoid indicates adaptation in English, and for a specific definition, refer to ITU-T G.805/ITU-T G.800

 : A solid inverted triangle in the figure indicates that the module has a termination function, the inverted triangle indicates trail termination in English, and for a specific definition, refer to ITU-T G.805/ITU-T G.800

 : A dashed inverted triangle in the figure indicates that the module has at least a termination function, and may further include another function, the inverted triangle indicates trail termination in English, and for a specific definition, refer to ITU-T G.805/ITU-T G.800

 : A solid ellipse in the figure indicates that the module has a connection function, the ellipse indicates connection or subnetwork in English, and for a specific definition, refer to ITU-T G.805/ITU-T G.800

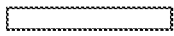 : A solid rectangle in the figure indicates that the module is a function module

FIG. 7b-3

COMMUNICATION METHOD, COMMUNICATIONS DEVICE, AND STORAGE MEDIUM

CROSS-REFERENCE TO RELATED APPLICATIONS

This application is a continuation of International Application No. PCT/CN2020/096433, filed on Jun. 16, 2020, which claims priority to Chinese Patent Application No. 201910849407.4, filed on Sep. 9, 2019. The disclosures of the aforementioned applications are hereby incorporated by reference in their entireties.

TECHNICAL FIELD

This application relates to the communications field, and in particular, to a communication method, a communications device, and a storage medium.

BACKGROUND

Standards related to the 802.3 standard Ethernet (StdE) defined by the Institute of Electrical and Electronics Engineers (IEEE) are widely applied in the industry. A related attribute of a single block is specified in the standard. For example, a specific structure form of the block is defined, and a specific scenario of using the block in a block stream is specified. When a related attribute of a block is consistent with that defined in the standard, the block is a valid block. When a related attribute of a block is inconsistent with that defined in the standard, the block is an invalid block.

For example, a 64B/66B block form is defined in 802.3. A 64B/66B block includes a synchronization header area and a non-synchronization header area (e.g., block payload), and the synchronization header area of the block occupies 2 bits. When a value carried in a synchronization header of a block is 01, the block is a data block. When a value carried in the synchronization header is 10, the block is a control block. An existing standard defines two cases of a synchronization header area of a 64B/66B block: 01 and 10. When a synchronization header area of a 64B/66B block is 00, the block may be referred to as an invalid block. For another example, when a synchronization header area of a 64B/66B block is 11, the block may be referred to as an invalid block.

In a data transmission process, there are some invalid blocks in a block stream due to some reasons, for example, a link fault and a line bit error. Transmission of these invalid blocks on a data link may cause a service data error.

SUMMARY

Embodiments of this application provide a communication method, a communications device, and a storage medium, to process an invalid block in a data stream.

According to a first aspect, an embodiment of the present invention provides a communication method. The method includes: obtaining N first block streams, where N is a positive integer; when there is an invalid block in the N first block streams, converting the invalid block in the N first block streams into a target block, to obtain a to-be-sent block stream; and sending the to-be-sent block stream. In this way, the invalid block in the block stream can be converted into the target block. This can reduce an error that occurs in service data and that is caused by the invalid block.

In the solution provided in the first aspect, a block in the N first block streams may be checked first, and then interleaving is performed. Alternatively, the N first block streams may be interleaved first, and then an invalid block in an interleaved block stream is checked. In this way, flexibility of the solution can be improved. A coding format of the interleaved block stream in which the invalid block is checked is converted, to allow compressed data and reduced overheads.

In an optional embodiment of the first aspect, the invalid block in the block stream is checked before interleaving. Specifically, when there is an invalid block in the N first block streams, the invalid block in the N first block streams is converted into a target block. The N first block streams in which the invalid block is converted into the target block are interleaved, to obtain the to-be-sent block stream. In this embodiment, optionally, that the N first block streams in which the invalid block is converted into the target block are interleaved, to obtain the to-be-sent block stream includes: interleaving the N first block streams in which the invalid block is converted into the target block, to obtain an interleaved block stream; and converting a coding format of the interleaved block stream from a first coding format to a second coding format, to obtain the to-be-sent block stream. A coding format of the N first block streams is the first coding format. Conversion of the coding format can allow compressed data and reduced overheads.

In another optional embodiment of the first aspect, the invalid block in the block stream is checked after interleaving. Specifically, the N first block streams are interleaved, to obtain an interleaved block stream. When there is an invalid block in the interleaved block stream, the invalid block in the interleaved block stream is converted into a target block, to obtain the to-be-sent block stream. In this embodiment, optionally, when there is an invalid block in the interleaved block stream, that the invalid block in the interleaved block stream is converted into a target block, to obtain the to-be-sent block stream includes: when there is an invalid block in the interleaved block stream, converting the invalid block in the interleaved block stream into a target block; and converting a coding format of the interleaved block stream in which the invalid block is converted into the target block from a first coding format to a second coding format, to obtain the to-be-sent block stream. A coding format of the N first block streams is the first coding format. Conversion of the coding format can allow compressed data and reduced overheads.

According to a second aspect, an embodiment of the present invention provides a communication method. The method includes: obtaining N first block streams, where N is a positive integer; when there is an invalid block in the N first block streams, converting the invalid block in the N first block streams into a target block, to obtain N second block streams; interleaving the N second block streams, to obtain a third block stream; and sending the third block stream. On one hand, the invalid block in the block stream can be converted into the target block. This can reduce an error that occurs in service data and that is caused by the invalid block. On the other hand, because the block stream before interleaving complies with a sequence of the block stream specified in a standard, the invalid block can be checked more comprehensively before interleaving.

In a possible embodiment of the second aspect, a coding format of a first block stream in the N first block streams is a first coding format, a coding format of a second block stream in the N second block streams is the first coding format, and a coding format of the third block stream is the first coding format. The sending the third block stream includes: converting the coding format of the third block stream into a second coding format, to obtain a fourth block stream, where a coding format of the fourth block stream is the second coding format, and the first coding format and the second coding format are different coding formats; and sending the fourth block stream. In this way, data can be compressed and overheads can be reduced.

In a possible embodiment of the second aspect, the converting the coding format of the third block stream into a second coding format, to obtain a fourth block stream includes: converting M blocks in the third block stream into one block in the fourth block stream, where M is an integer greater than 1. In a transmission process, a plurality of blocks are converted into one block. This can allow compressed data and reduced overheads.

In a possible embodiment of the second aspect, if M is not greater than N, the M blocks in the third block stream that correspond to the one block in the fourth block stream are from M first block streams in the N first block streams, and two first block streams corresponding to any two of the M blocks are different. If M is greater than N, there are at least N blocks in the M blocks in the third block stream that correspond to the one block in the fourth block stream, the N blocks are from the N first block streams, and two first block streams corresponding to any two of the N blocks are different. In this way, a block obtaining operation may be performed on block streams in the first coding format in turn, to obtain block streams in the second coding format. In addition, the solution is simple, and it is easier to restore the block streams in the first coding format from the block streams in the second coding format.

In a possible embodiment of the second aspect, when there is an invalid block in the N first block streams, the converting the invalid block in the N first block streams into a target block includes: for a block in one of the N first block streams, when a synchronization header area of the block is 00, converting the block into the target block; when a synchronization header area of the block is 11, converting the block into the target block; or when a synchronization header area of the block is 10, and a value carried in a type field of the block is an invalid value, converting the block into the target block. In this way, the invalid block can be prevented from contaminating and spreading to another service data stream.

In a possible embodiment of the second aspect, when there is an invalid block in the N first block streams, the converting the invalid block in the N first block streams into a target block includes: converting the block into the target block when the block meets any one of the following content: The block is located in an inter-frame gap and is a data block; the block is located in the middle of a frame and is a control block; a block adjacent to the block is an idle block, and the block is a data block; and a block adjacent to the block is a low-power block, and the block is a data block. A specific position of the block may be checked before interleaving, so that the block can be checked more comprehensively.

In a possible embodiment of the second aspect, the target block includes a data block and/or an error block. When the target block is a data block, a block that changes to an invalid block due to a bit error can be restored to the block before the change. When the target block is an error block, the block can be prevented from contaminating other service data.

In a possible embodiment of the second aspect, when there is an invalid block in the N first block streams, the converting the invalid block in the N first block streams into a target block includes: for the block in the one of the N first block streams, when the synchronization header area of the block is 00 or 11, and the block is located in the middle of a frame, replacing a synchronization header of the block with 01; when the synchronization header area of the block is 10, a value carried in a type field of the block is an invalid value, and the block is located in the middle of a frame, replacing a synchronization header of the block with 01, so that a block that changes to an invalid block due to a bit error can be restored to the block before the change; when the synchronization header area of the block is 00 or 11, and the block is located in an inter-frame gap, replacing the block with an error block; or when the synchronization header area of the block is 10, a value carried in a type field of the block is an invalid value, and the block is located in an inter-frame gap, replacing the block with an error block, so that the block can be prevented from contaminating other service data.

In a possible embodiment of the second aspect, the N first block streams are block streams into which first overhead information is inserted. In this way, a block carrying the first overhead information can be checked, so that the check is more comprehensive.

According to a third aspect, a communication method is provided. The method includes: obtaining N first block streams, where N is a positive integer; interleaving the N first block streams, to obtain a fifth block stream; when there is an invalid block in the fifth block stream, converting the invalid block in the fifth block stream into a target block, to obtain a sixth block stream; and sending the sixth block stream. In this way, the invalid block in the block stream can be converted into the target block. This can reduce an error that occurs in service data and that is caused by the invalid block.

In a possible embodiment of the third aspect, a coding format of a first block stream in the N first block streams is a first coding format, a coding format of the fifth block stream is the first coding format, and a coding format of the sixth block stream is the first coding format. The sending the sixth block stream includes: converting the coding format of the sixth block stream into a second coding format, to obtain a seventh block stream, where a coding format of the seventh block stream is the second coding format, and the first coding format and the second coding format are different coding formats; and sending the seventh block stream. In this way, data can be compressed and overheads can be reduced.

In a possible embodiment of the third aspect, the converting the coding format of the sixth block stream into a second coding format, to obtain a seventh block stream includes: converting M blocks in the sixth block stream into one block in the seventh block stream, where M is an integer greater than 1. In a sending process, a plurality of blocks are converted into one block. This can allow compressed data and reduced overheads.

In a possible embodiment of the third aspect, if M is not greater than N, the M blocks in the sixth block stream that correspond to the one block in the seventh block stream are from M first block streams in the N first block streams, and two first block streams corresponding to any two of the M blocks are different. If M is greater than N, there are at least N blocks in the M blocks in the sixth block stream that correspond to the one block in the seventh block stream, the N blocks are from the N first block streams, and two first block streams corresponding to any two of the N blocks are different. In this way, a block obtaining operation may be performed on block streams in the first coding format in turn, to obtain block streams in the second coding format.

In a possible embodiment of the third aspect, when there is an invalid block in the fifth block stream, converting the invalid block in the fifth block stream into a target block, to obtain a sixth block stream includes: for a block in the fifth block stream, when a synchronization header area of the block is 00, converting the block into the target block; when a synchronization header area of the block is 11, converting the block into the target block; or when a synchronization header area of the block is 10, and a value carried in a type field of the block is an invalid value, converting the block into the target block. In this way, the invalid block can be prevented from contaminating and spreading to another service data stream.

In a possible embodiment of the third aspect, the target block includes a data block and/or an error block. When the target block is a data block, a block that changes to an invalid block due to a bit error can be restored to the block before the change. When the target block is an error block, the block can be prevented from contaminating other service data.

In a possible embodiment of the third aspect, the fifth block stream is a block stream into which second overhead information is inserted. In this way, the second overhead information can be checked, so that the check is more comprehensive.

In a possible embodiment of the third aspect, the fifth block stream is a block stream before scrambling. In this way, the invalid block can be prevented from contaminating and spreading to another correct bit during scrambling.

According to a fourth aspect, a communication method is provided. The method includes: obtaining an eighth block stream; and when there is an invalid block in the eighth block stream, converting the invalid block in the eighth block stream into a target block. In this way, the invalid block in the block stream can be converted into the target block. This can reduce an error that occurs in service data and that is caused by the invalid block.

To improve flexibility of the solution, in the fourth aspect, the invalid block may be checked before de-interleaving, or the invalid block may be checked after de-interleaving. The following describes in detail a fifth aspect and a sixth aspect.

According to the fifth aspect, a communication method is provided. The method includes: obtaining an eighth block stream; de-interleaving the eighth block stream, to obtain N ninth block streams; when there is an invalid block in the N ninth block streams, converting the invalid block in the N ninth block stream into a target block, to obtain N tenth block streams; and interleaving the N tenth block streams and L other block streams, to obtain an interleaved block stream, and sending the interleaved block stream, where L is zero or a positive integer. In this way, the invalid block in the block stream can be converted into the target block. This can reduce an error that occurs in service data and that is caused by the invalid block.

According to a sixth aspect, a communication method is provided. The method includes: obtaining an eighth block stream; de-interleaving the eighth block stream, to obtain N ninth block streams; when there is an invalid block in the N ninth block streams, converting the invalid block in the N ninth block stream into a target block, to obtain N tenth block streams; and performing decoding processing on the N tenth block streams by using a physical coding sublayer PCS layer. In this way, load of the PCS layer can be shared.

In a possible embodiment of the fifth aspect or the sixth aspect, a coding format of the eighth block stream is a first coding format, and a coding format of the ninth block stream in the N ninth block streams is the first coding format. The obtaining an eighth block stream includes: receiving an eleventh block stream, where a coding format of the eleventh block stream is a second coding format; and converting the coding format of the eleventh block stream into the first coding format, to obtain the eighth block stream. In this way, data can be compressed and overheads can be reduced.

In a possible embodiment of the fifth aspect or the sixth aspect, the converting the coding format of the eleventh block stream into the first coding format, to obtain the eighth block stream includes: converting one block in the eleventh block stream into M blocks in the eighth block stream, where M is an integer greater than 1. In a transmission process, a plurality of blocks are converted into one block. This can allow compressed data and reduced overheads.

In a possible embodiment of the fifth aspect or the sixth aspect, for the M blocks in the eighth block stream that are converted from the one block in the eleventh block stream, if M is not greater than N, the M blocks correspond to M ninth block streams in the N ninth block streams, and two ninth block streams corresponding to any two of the M blocks are different; or if M is greater than N, there are at least N blocks in the M blocks, the N blocks correspond to the N ninth block streams, and two ninth block streams corresponding to any two of the N blocks are different. In this way, in a coding format conversion process, a block obtaining operation may be performed on block streams in the first coding format in turn, to obtain block streams in the second coding format. In addition, the solution is simple, and it is easier to restore the block streams in the first coding format from the block streams in the second coding format.

In a possible embodiment of the fifth aspect or the sixth aspect, when there is an invalid block in the N ninth block streams, the converting the invalid block in the N ninth block streams into a target block includes: for a block in one of the N ninth block streams, when a synchronization header area of the block is 00, converting the block into the target block; when a synchronization header area of the block is 11, converting the block into the target block; or when a synchronization header area of the block is 10, and a value carried in a type field of the block is an invalid value, converting the block into the target block. In this way, the invalid block can be prevented from contaminating and spreading to another service data stream.

In a possible embodiment of the fifth aspect or the sixth aspect, when there is an invalid block in the N ninth block streams, the converting the invalid block in the N ninth block streams into a target block includes: converting the block into the target block when the block meets any one of the following content: The block is located in an inter-frame gap and is a data block; the block is located in the middle of a frame and is a control block; a block adjacent to the block is an idle block, and the block is a data block; and a block adjacent to the block is a low-power block, and the block is a data block. A specific position of the block may be checked before interleaving, so that the block can be checked more comprehensively.

In a possible embodiment of the fifth aspect or the sixth aspect, the target block includes a data block and/or an error block. When the target block is a data block, a block that changes to an invalid block due to a bit error can be restored to the block before the change. When the target block is an error block, the block can be prevented from contaminating other service data.

In a possible embodiment of the fifth aspect or the sixth aspect, when there is an invalid block in the N ninth block streams, the converting the invalid block in the N ninth block streams into a target block includes: for the block in the one of the N ninth block streams, when the synchronization header area of the block is 00 or 11, and the block is located in the middle of a frame, replacing a synchronization header of the block with 01, so that a block that changes to an invalid block due to a bit error can be restored to the block before the change; when the synchronization header area of the block is 10, a value carried in a type field of the block is an invalid value, and the block is located in the middle of a frame, replacing a synchronization header of the block with 01; when the synchronization header area of the block is 00 or 11, and the block is located in an inter-frame gap, replacing the block with an error block; or when the synchronization header area of the block is 10, a value carried in a type field of the block is an invalid value, and the block is located in an inter-frame gap, replacing the block with an error block, so that the block can be prevented from contaminating other service data.

In a possible embodiment of the fifth aspect or the sixth aspect, the N ninth block streams are block streams before first overhead information is extracted. In this way, a block carrying the first overhead information can be checked, so that the check is more comprehensive.

According to a seventh aspect, a communication method is provided. The method includes: obtaining an eighth block stream; when there is an invalid block in the eighth block stream, converting the invalid block in the eighth block stream into a target block, to obtain a twelfth block stream; de-interleaving the twelfth block stream, to obtain N thirteenth block streams; and interleaving the N thirteenth block streams and L other block streams, to obtain an interleaved block stream, and sending the interleaved block stream, where L is zero or a positive integer. In this way, the invalid block in the block stream can be converted into the target block. This can reduce an error that occurs in service data and that is caused by the invalid block.

According to an eighth aspect, a communication method is provided. The method includes: obtaining an eighth block stream; when there is an invalid block in the eighth block stream, converting the invalid block in the eighth block stream into a target block, to obtain a twelfth block stream; de-interleaving the twelfth block stream, to obtain N thirteenth block streams; and performing decoding processing on the N thirteenth block streams by using a physical coding sublayer PCS layer. In this way, load of the PCS layer can be shared.

In a possible embodiment of the seventh aspect or the eighth aspect, a coding format of the eighth block stream is a first coding format, a coding format of the twelfth block stream is the first coding format, and a coding format of a ninth block stream in the N thirteenth block streams is the first coding format. The obtaining an eighth block stream includes: receiving an eleventh block stream, where a coding format of the eleventh block stream is a second coding format; and converting the coding format of the eleventh block stream into the first coding format, to obtain the eighth block stream. In this way, data can be compressed and overheads can be reduced.

In a possible embodiment of the seventh aspect or the eighth aspect, the converting the coding format of the eleventh block stream into the first coding format, to obtain the eighth block stream includes: converting one block in the eleventh block stream into M blocks in the eighth block stream, where M is an integer greater than 1. In a transmission process, a plurality of blocks are converted into one block. This can allow compressed data and reduced overheads.

In a possible embodiment of the seventh aspect or the eighth aspect, for the M blocks in the eighth block stream that are converted from the one block in the eleventh block stream, if M is not greater than N, the M blocks correspond to M ninth block streams in the N ninth block streams, and two ninth block streams corresponding to any two of the M blocks are different; or if M is greater than N, there are at least N blocks in the M blocks, the N blocks correspond to the N ninth block streams, and two ninth block streams corresponding to any two of the N blocks are different. In this way, in a coding format conversion process, a block obtaining operation may be performed on block streams in the first coding format in turn, to obtain block streams in the second coding format. In addition, the solution is simple, and it is easier to restore the block streams in the first coding format from the block streams in the second coding format.

In a possible embodiment of the seventh aspect or the eighth aspect, when there is an invalid block in the eighth block stream, converting the invalid block in the eighth block stream into a target block, to obtain a twelfth block stream includes: for a block in the eighth block stream, when a synchronization header area of the block is 00, converting the block into the target block; when a synchronization header area of the block is 11, converting the block into the target block; or when a synchronization header area of the block is 10, and a value carried in a type field of the block is an invalid value, converting the block into the target block. In this way, the invalid block can be prevented from contaminating and spreading to another service data stream.

In a possible embodiment of the seventh aspect or the eighth aspect, the target block includes a data block and/or an error block. When the target block is a data block, a block that changes to an invalid block due to a bit error can be restored to the block before the change. When the target block is an error block, the block can be prevented from contaminating other service data.

In a possible embodiment of the seventh aspect or the eighth aspect, the eighth block stream is a block stream before second overhead information is extracted. In this way, a block carrying the second overhead information can be checked, so that the check is more comprehensive.

In a possible embodiment of the seventh aspect or the eighth aspect, the eighth block stream is a block stream after descrambling. In this way, the invalid block can be prevented from contaminating and spreading to another correct bit during scrambling.

According to a ninth aspect, a communications device is provided. The communications device includes a transceiver unit and a processing unit, to perform any embodiment of any communication method according to the first aspect to the eighth aspect. The transceiver unit is configured to perform functions related to sending and receiving. Optionally, the transceiver unit includes a receiving unit and a sending unit. In a design, the communications device is a communications chip, and the transceiver unit may be an input/output circuit or a port of the communications chip.

In another design, the transceiver unit may be a transmitter and a receiver, or the transceiver unit may be a transmitting machine and a receiving machine.

Optionally, the communications device further includes modules that may be configured to perform any embodiment of any communication method according to the first aspect to the eighth aspect.

According to a tenth aspect, a communications device is provided. The communications device is a sending device or a receiving device. The communications device includes a processor and a memory. Optionally, the communications device further includes a transceiver. The memory is configured to store a computer program or instructions. The processor is configured to invoke the computer program or the instructions from the memory and run the computer program or the instructions. When the processor executes the computer program or the instructions in the memory, the communications device is enabled to perform any embodiment of any communication method according to the first aspect to the eighth aspect.

Optionally, there are one or more processors, and there are one or more memories.

Optionally, the memory may be integrated with the processor, or the memory and the processor are disposed separately.

Optionally, the transceiver may include a transmitting machine (e.g., a transmitter) and a receiving machine (e.g., a receiver).

According to an eleventh aspect, a communications device is provided. The communications device includes a processor. The processor is coupled to a memory, and may be configured to perform the method according to any one of the first aspect to the eighth aspect or any one of the possible embodiments of the first aspect to the eighth aspect. Optionally, the communications device further includes the memory. Optionally, the communications device further includes a communications interface, and the processor is coupled to the communications interface.

In an embodiment, the communications device is a network device. When the communications device is a network device, the communications interface may be a transceiver or an input/output interface. Optionally, the transceiver may be a transceiver circuit. Optionally, the input/output interface may be an input/output circuit.

In another embodiment, the communications device is a chip or a chip system. When the communications device is a chip or a chip system, the communications interface may be an input/output interface, an interface circuit, an output circuit, an input circuit, a pin, a related circuit, or the like on the chip or the chip system. The processor may alternatively be embodied as a processing circuit or a logic circuit.

According to a twelfth aspect, a system is provided. The system includes the foregoing sending device and receiving device.

According to a thirteenth aspect, a computer program product is provided. The computer program product includes a computer program (which may also be referred to as code or instructions). When the computer program is run, a computer is enabled to perform the method according to any possible embodiment of the first aspect, or perform the method according to any embodiment of the first aspect to the eighth aspect.

According to a fourteenth aspect, a computer-readable storage medium is provided. The computer-readable medium stores a computer program (which may also be referred to as code or instructions). When the computer program is run on a computer, the computer is enabled to perform the method according to any possible embodiment of the first aspect, or perform the method according to any embodiment of the first aspect to the eighth aspect.

According to a fifteenth aspect, a processing apparatus is provided. The processing apparatus includes an input circuit, an output circuit, and a processing circuit. The processing circuit is configured to: receive a signal through the input circuit, and transmit a signal through the output circuit, so that the method according to any one of the first aspect to the eighth aspect and any one of the possible embodiments of the first aspect to the eighth aspect is implemented.

In a specific embodiment process, the processing apparatus may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific embodiments of the processor and the various circuits are not limited in embodiments of this application.

BRIEF DESCRIPTION OF DRAWINGS

FIG. 2a is a schematic diagram of a structure of a block in a 64B/66B coding format;

FIG. 2b shows a structural form of an idle block;

FIG. 2c shows a structural form of an error block;

FIG. 2d shows a structural form of a low-power block;

FIG. 4b is a schematic diagram of a process of processing a block stream in FIG. 4a;

FIG. 4c is a schematic diagram of data transmission when there is an invalid block in a data stream shown in FIG. 4a;

FIG. 7b-1 to FIG. 7b-3 are a schematic diagram of a data stream transmission process according to an embodiment of this application;

FIG. 7c is a schematic diagram of a data stream transmission process in which a conversion module is added to FIG. 7a;

FIG. 8b is a schematic diagram of a data stream transmission process in which a conversion module is added to FIG. 7a;

FIG. 10b is a schematic diagram of a data stream transmission process in which a conversion module is added to FIG. 7a;

FIG. 11b is a schematic diagram of a data stream transmission process in which a conversion module is added to FIG. 7a;

DESCRIPTION OF EMBODIMENTS

Figure 1:
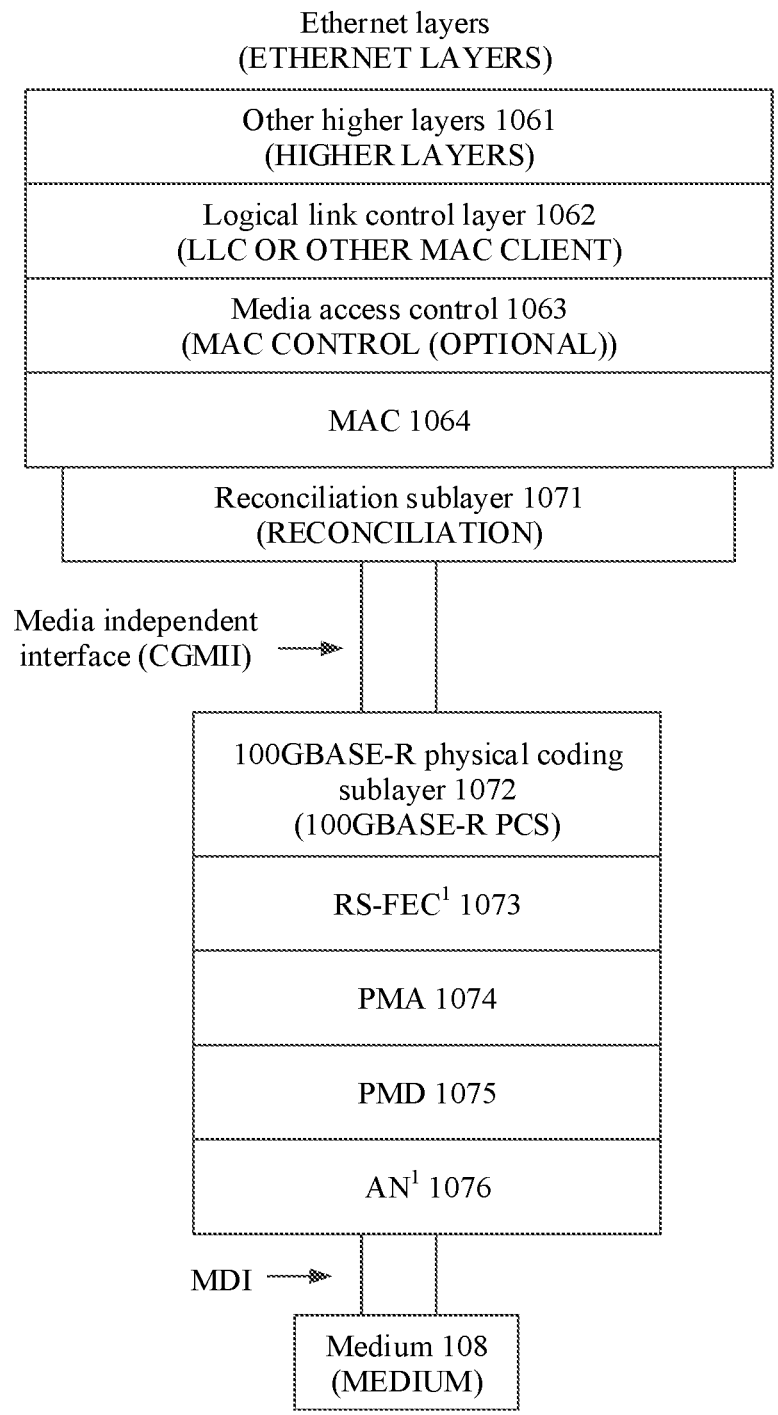
FIG. 1 is a schematic diagram of a structure of a 100GBASE-R Ethernet interface.

FIG. 1 is a schematic diagram showing an example of a structure of a 100GBASE-R Ethernet interface. As shown in FIG. 1, the 100GBASE-R Ethernet interface includes other higher layers 1061, a logical link control (LLC) layer 1062, a media access control (MAC Control) layer 1063, a media access control (MAC) layer 1064, a reconciliation sublayer (RS) 1071, a 100GBASE-R physical coding sublayer (PCS) 1072, a Reed-Solomon coding sublayer (RS-FEC) 1073, a physical medium attachment (PMA) layer 1074, a physical medium dependent (PMD) layer 1075, an auto-negotiation (AN) layer 1076, and a medium 108.

When an Ethernet PHY carries a MAC data stream, the MAC data stream is transmitted through an interface, and is sequentially processed by the MAC layer 1064, the reconciliation sublayer 1071, the PCS 1072, the RS-FEC 1073, the PMA 1074, and the PMD 1075 from top to bottom. A processed data stream is embodied as a signal sent to a link medium. In a receiving direction, a reverse process is performed. The signal is received from the link medium, and is sequentially processed by the PMD 1075, the PMA 1074, the RS-FEC 1073, and the PCS 1072, to restore the MAC data stream.

Coding format conversion is performed at the FEC 1073 in the Ethernet. 64B/66B and 256B/257B coding formats are used as examples. Other coding formats are also applicable. In embodiments of this application, a related attribute of a block is defined in a standard. A block that matches the related attribute of the block defined in the standard is referred to as a valid block, and a block that does not match the related attribute of the block defined in the standard is referred to as an invalid block. The related attribute of the block may include a plurality of types, for example, a structure form of the block and a position relationship of the block.

FIG. 2a is a schematic diagram showing an example of a structure of a block in a 64B/66B coding format defined in a standard. As shown in FIG. 2a, the block is defined in the IEEE Std 802.3-2018.IEEE Standard for Ethernet SECTION SIX. As shown in FIG. 2a, a synchronization header area of the block includes the 0th bit and the first bit of the block. The synchronization header area of the block has two cases: 01 and 10. A block whose synchronization header is 01 is referred to as a data block, and the data block may be denoted as a D block. A block whose synchronization header is 10 is referred to as a control block. A field DO of the control block occupies 8 bits, and may be referred to as a type field (which may be denoted as a type field) of the control block.

The control block may include a header block, a tail block, an ordered set block (which may also be denoted as an O block), an idle block (which may also be denoted as an IDLE block), an error block (which may also be denoted as an error block), a low-power block, and the like. In embodiments of this application, the header block is a block whose synchronization header is 10 and whose type field is 0x78 in FIG. 2a, and may be denoted as an S block. In embodiments of this application, the tail block may be denoted as a T block. Tail blocks include blocks whose synchronization header is 10 and whose type fields are 0x87, 0x99, 0xAA, 0xB4, 0xCC, 0xD2, 0xE1, and 0xFF in FIG. 2a. In embodiments of this application, the O block is a block whose synchronization header is 10 and whose type field is 0x4B in FIG. 2a. In embodiments of this application, a control block other than an S block and a T block in control blocks may be denoted as a C block.

FIG. 2b shows an example of a structural form of an idle block, FIG. 2c shows an example of a structural form of an error block, and FIG. 2d shows an example of a structural form of a low-power block. As shown in FIG. 2b, FIG. 2c, and FIG. 2d, synchronization header areas of the idle block, the error block, and the low-power block are all 10. Other content is shown in the figures. A block in embodiments of this application is described by using the block structural form shown in FIG. 2a as an example. However, embodiments of this application are also applicable to block forms defined in other standards, for example, 8B/10B, and 256B/257B.

As shown in FIG. 1, in a sending direction, a coding format of a data stream output by the PCS sublayer 1072 is 64B/66B, and the coding format of the data stream is converted into 256B/257B in the RS-FEC[1] 1073, to allow compressed coding overheads. In a receiving direction, the coding format of the data stream is converted from 256B/257B to 64B/66B in the RS-FEC[1] 1073.

Figure 3:
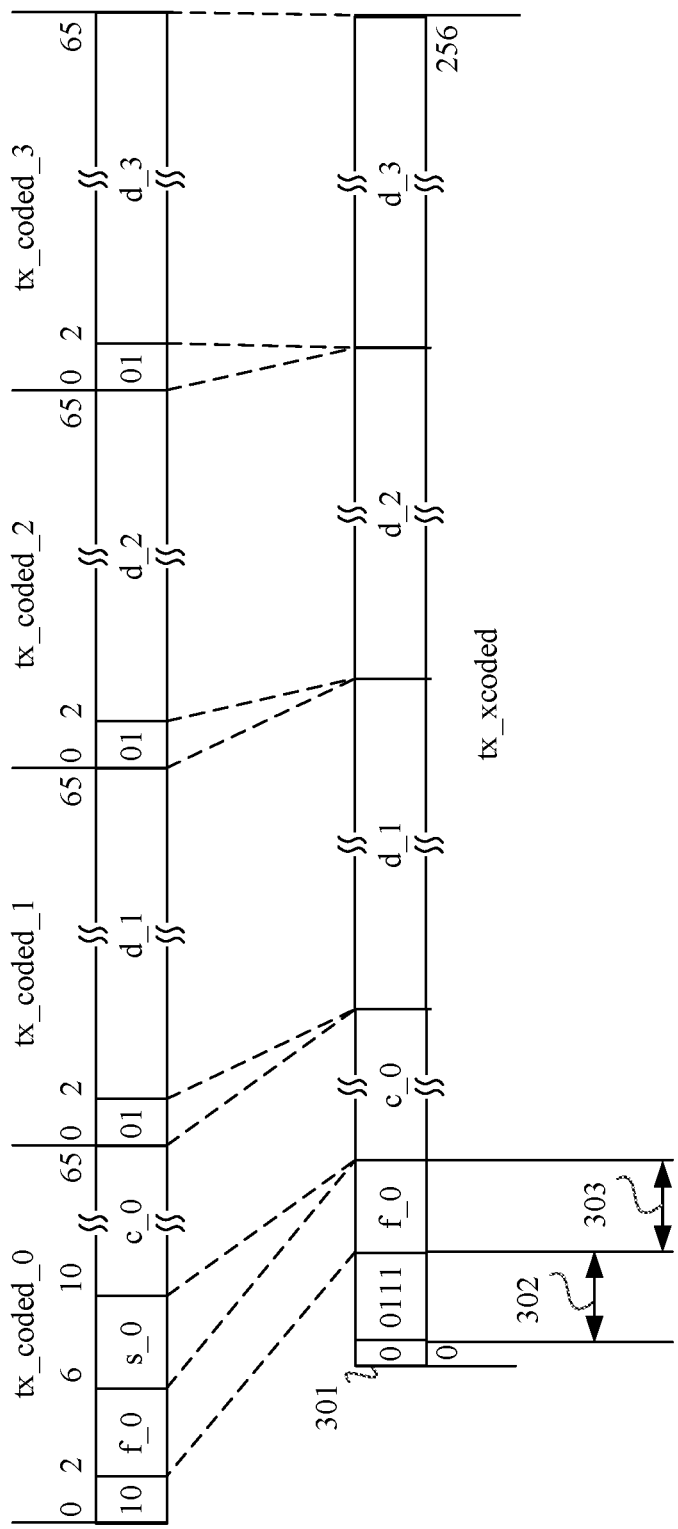
FIG. 3 is a schematic diagram of conversion between four blocks in a 64B/66B coding format and one block in a 256B/257B coding format.

FIG. 3 is a schematic diagram showing an example of conversion between four blocks in a 64B/66B coding format and one block in a 256B/257B coding format. For conversion between the coding formats, refer to the clause 91.5.2 of IEEE 802.3. In embodiments of this application, a frame refers to a data unit (e.g., a MAC frame) that meets an IEEE 802.3 frame requirement. Particularly, an inter-frame gap refers to an interval between two frames (MAC frames). The middle of a frame (IPG) refers to a position between a start indication and an end indication of the frame. Corresponding to a block stream form after coding, for example, after 64B/66B coding, a frame is defined by a header block (S block) and a tail block (T block), and a block sequence of data blocks (D blocks) is in the middle. As shown in FIG. 3, the four blocks in the 64B/66B coding format are: tx_coded_0, tx_coded_1, tx_coded_2, and tx_coded_3. A synchronization header area of tx_coded_0 is 10, and the block is a control block. The second bit to the tenth bit of tx_coded_0 carry eight bits of a type (type) field of the block, where f_0 represents the first four bits of the type field, s_0 represents the last four bits of the type field, and c_0 represents an area from the tenth bit to the $65^{th}$ bit of tx_coded_0. A synchronization header area of tx_coded_1 is 01, and the block is a data block, where d_1 represents an area from the second bit to the $65^{th}$ bit of tx_coded_1. A synchronization header area of tx_coded_2 is 01, and the block is a data block, where d_2 represents an area from the second bit to the $65^{th}$ bit of tx_coded_2. A synchronization header area of tx_coded_3 is 01, and the block is a data block, where d_3 represents an area from the second bit to the $65^{th}$ bit of tx_coded_3.

As shown in FIG. 3, tx_xcoded represents the one block in the 256B/257B coding format. When a value of the $0^{th}$ bit of tx_xcoded is 0, it indicates that at least one block in the four blocks in the 64B/66B coding format that are included in the block in the 256B/257B coding format is a control block. When a value of the $0^{th}$ bit 301 of tx_xcoded is 1, it indicates that all the four blocks in the 64B/66B coding format that are included in the block in the 256B/257B coding format are data blocks. Values of the first bit to the fourth bit of tx_xcoded are bitmaps of block types of the four blocks in the 64B/66B coding format that are included in the block. For example, when a value of an area 302 in FIG. 3 is 0111, it indicates that block types of the four blocks sequentially carried by the block are a control block, a data block, a data block, and a data block. The fifth bit to the eighth bit of tx_xcoded carry the first four bits of a type field of the control block. For example, an area 303 may carry f_0 including the second bit to the sixth bit of tx_coded_0. The ninth bit to the $64^{th}$ bit of tx_xcoded carry c_0 including the tenth bit to the $65^{th}$ bit of the control block tx_coded_0. The $65^{th}$ bit to the $128^{th}$ bit of tx_xcoded carry d_1 including the second bit to the $65^{th}$ bit of the data block tx_coded_1. The $129^{th}$ bit to the $192^{nd}$ bit of tx_xcoded carry d_2 including the second bit to the $65^{th}$ bit of the data block tx_coded_2. The $193^{rd}$ bit to the $256^{th}$ bit of tx_xcoded carry d_3 including the second bit to the $65^{th}$ bit of the data block tx_coded_3. It can be seen that none of the four synchronization header areas of tx_coded_0, tx_coded_1, tx_coded_2, and tx_coded_3 is carried in tx_xcoded. In addition, the last four bits of the type field of tx_coded_0 are not carried in tx_xcoded. In the receiving direction, the block in the 256B/257B coding format may be restored to the four blocks in the 64B/66B coding format based on the first bit, the area 302, the area 303, and other content in tx_xcoded.

In a data stream transmission process, an error occurs in a block due to some reasons. For example, a bit error occurs in the data stream transmission process, and consequently a value carried in a synchronization header area of the block changes to 00 or 11. The block whose synchronization header area is 00 or 11 may be referred to as an invalid block. In addition to the error of the block caused by the reason such as the bit error mentioned above, when a forward error correction (FEC) decoding module (the FCE decoding module may also be denoted as the FEC decoder module) fails to correct an error, the FCE decoding module forcibly performs an invalidation marking operation on synchronization headers of a part or all 64B/66B blocks in all corresponding 64B/66B blocks included in one FEC codeword. Specifically, when the FCE decoder module fails to correct an error, the FCE decoder module forcibly marks synchronization header areas of some blocks as 00 or 11. The block whose synchronization header area is marked as 00 or 11 may be referred to as an invalid block. For example, for the 100GBASE-R PHY RS (528, 514)/RS (544, 514) defined in the clause 91 of the IEEE 802.3 standard, an error correction capability is t=7, and an error detection capability is 2t=14. When the FEC capability is exceeded, an RS decoder module intentionally sets synchronization headers of some 66-bit blocks to 11. Specifically, a position of a marked block is selected, so that all errored frames are discarded. For other 200GBASE-R/400GBASE-R RS (544, 514), refer to a definition in the clause 119 of the IEEE 802.3 standard. For the 50GBASE-R PHY RS (544, 514), refer to a definition in the clause 134 of the IEEE 802.3 standard. Details are not described herein again.

In the data transmission process, as shown in FIG. 3, the four blocks in the 64B/66B coding format are from a plurality of MAC data streams, for example, the four blocks in the 64B/66B coding format are from four MAC data streams respectively, and a block becomes an invalid block due to the foregoing reason, for example, an error occurs in tx_coded_3, and the synchronization header area changes to 00 or changes to 11. In this case, the transcoded block tx_xcoded is encoded into a block of 01111+252 bits. Such transcoding may cause all the four blocks to become error blocks (the error block refers to an error block defined in the standard) at the PCS layer during decoding. It can be learned that, when the four blocks in the 64B/66B coding format that are included in the one block in the 256B/257B coding format are from a plurality of MAC data streams, if an error occurs in a block in one MAC data stream, the invalid block contaminates and spreads to other MAC data streams in a decoding process. Consequently, both an error MAC frame and a MAC frame contaminated by the block fail a cyclic redundancy check (CRC) at the MAC layer, and are discarded. In addition, with the emergence and application of two technologies such as flexible Ethernet (FlexE) and metro transport network (MTN), a typical feature of the two technologies is that after block multiplexing is performed on a plurality of MAC data streams, the data streams are transmitted by reusing an Ethernet interface. Therefore, the problem of contamination and spreading to other data streams described above is serious.

Figure 4A:
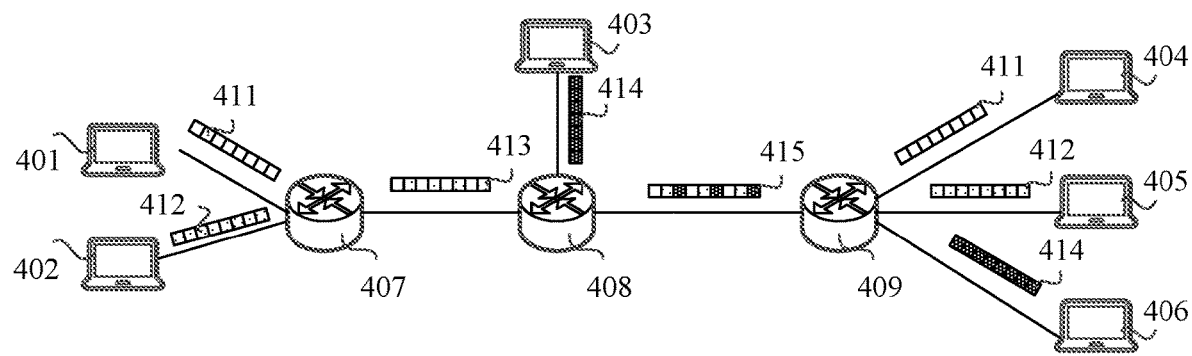
FIG. 4a is a schematic diagram of a network topology.
Figure 4B:
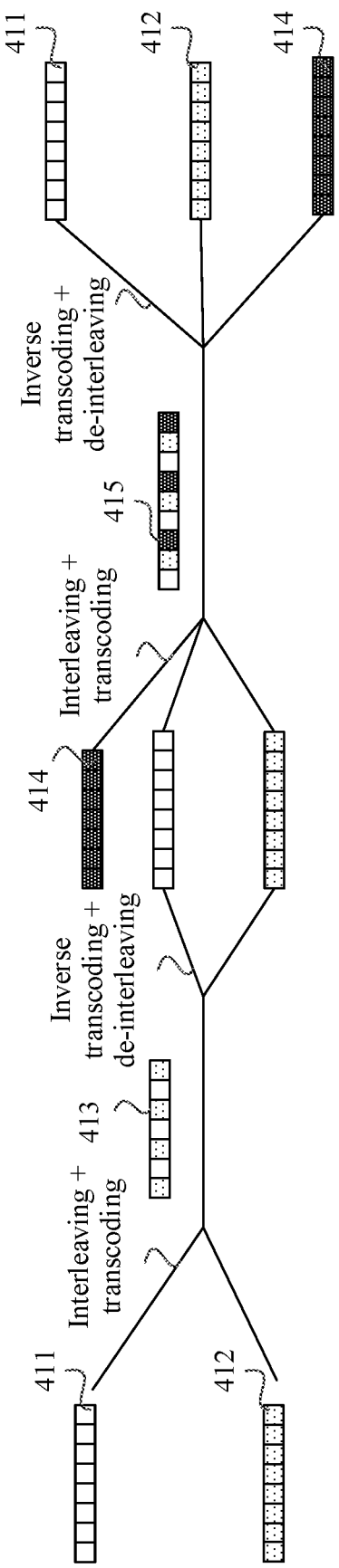
Figure 4C:
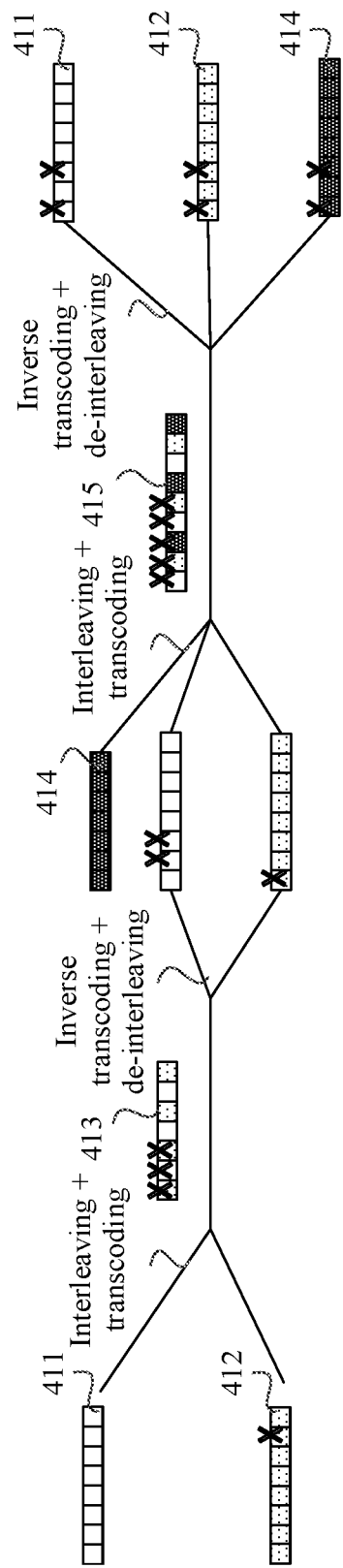

To explain the contamination and spreading problem, the following further provides descriptions with reference to FIG. 4a, FIG. 4b, and FIG. 4c. FIG. 4a is a schematic diagram showing an example of a network topology. FIG. 4b is a schematic diagram showing an example of a process of processing a block stream in FIG. 4a. The problem is described with reference to FIG. 4a and FIG. 4b. As shown in FIG. 4a, the network topology includes a client 401, a client 402, a client 403, a client 404, a client 405, and a client 406. The network topology includes three nodes: a node 407, a node 408, and a node 409. Each node has a sending function and a receiving function. The solution provided in this embodiment of this application is performed by a sending module and a receiving module. The sending module and the receiving module in this embodiment of this application may be disposed on any one node. When a data stream is sent from the client 401 to the client 404, from the client 402 to the client 405, and from the client 403 to the client 406, the node 407 may be referred to as a sending node, the node 408 is referred to as an intermediate node, and the node 409 is referred to as a receiving node. It can be seen from FIG. 4a that, although the node 408 is an intermediate node, the intermediate node 408 is a sending node of the client 403.

As shown in FIG. 4a and FIG. 4b, the node 407 receives a data stream 411 of the client 401 and a data stream 412 of the client 402, and interleaves and transcodes the data stream 411 and the data stream 412, to obtain a data stream 413. In embodiments of this application, transcoding refers to conversion of a coding format of a block stream, and inverse transcoding refers to an inverse process of transcoding. The node 407 sends the data stream 413 to the node 408. After receiving the data stream 413, the node 408 inverse-transcodes and de-interleaves the data stream 413, and interleaves and transcodes two obtained data streams and a data stream 414, to obtain a data stream 415. After receiving the data stream 415, the node 409 inverse-transcodes and de-interleaves the data stream 415, to restore the data stream 411, the data stream 412, and the data stream 414. The node 409 sends the data stream 411 to the client 404, sends the data stream 412 to the client 405, and sends the data stream 414 to the client 406. In this embodiment of this application, when a plurality of data streams are interleaved into one interleaved data stream, one block may be sequentially obtained from each data stream for interleaving. As shown in FIG. 4a, one or more blocks may be obtained from one data stream, and one or more blocks may be obtained from another data stream. In other words, during interleaving, a quantity of blocks obtained from each block stream at a time is not limited.

FIG. 4c is a schematic diagram showing an example of data transmission when there is an invalid block in the data stream shown in FIG. 4a. As shown in FIG. 4c, if there is an invalid block in the data stream 412, after transcoding, the invalid block in the data stream 412 contaminates a block that is from the data stream 411 and that is in the data stream 413. Further, there are invalid blocks in both of the two data streams obtained after the node 407 inverse-transcodes and de-interleaves the data stream 413. Because the node 408 interleaves and transcodes the two data streams having the invalid blocks and the data stream 414 again, the invalid blocks continue to contaminate a block from the data stream 414. Finally, the data stream 411, the data stream 412, and the data stream 414 that are obtained through inverse transcoding and de-interleaving by the node 409 are all contaminated. When an error is quantized, specifically, one invalid block in one block stream in FIG. 4a causes four error blocks during one time of transcoding, and during next time of transcoding, the four error blocks cause 16 blocks with invalid synchronization headers to be generated, and so on. Therefore, contamination of the error is based on an exponent of 4.

In view of the foregoing problem, an embodiment of this application provides a communication solution. The communication solution is used to process an invalid block, to reduce the foregoing contamination and spreading problem caused by the invalid block.

The solution provided in this embodiment of this application may be applied to a network in a coding format conversion scenario, a network in an FEC scenario, or a network in a scenario in which data is stored after compression or is sent after compression. For example, the solution may be applied to existing networks based on an interleaving technology in which TDM timeslot cross is performed after a 64B/66B block is coded, for example, a network using a FlexE technology, a network using an SPN technology, and an MTN network that is being standardized in the ITU-T SG15 WP3 Q11. The FlexE technology is an interface technology. According to the technology, data streams from a plurality of MAC layers can be interleaved, and an interleaved data stream is sent through an Ethernet interface. In a next-generation transport network technology system defined by the ITU-T to meet a new service requirement, such as 5G, a new transport network network including a section layer and a path layer is introduced on the basis of reusing FlexE logic. A physical layer is compatible with existing interface technologies such as 50GBASE R, 100GBASE R, 200GBASE R, and 400GBASE R. Currently, the ITU-T has completed project initiation of the technology standard system, including G.mtn "MTN interface and frame structure", G.mtn-arch "MTN functional architecture", G.mtn-eqpt "MTN equipment functional model", G.mtn-prot "MTN linear protection", G.mtn-mgmt "MTN management and control", and the like.

Figure 5:
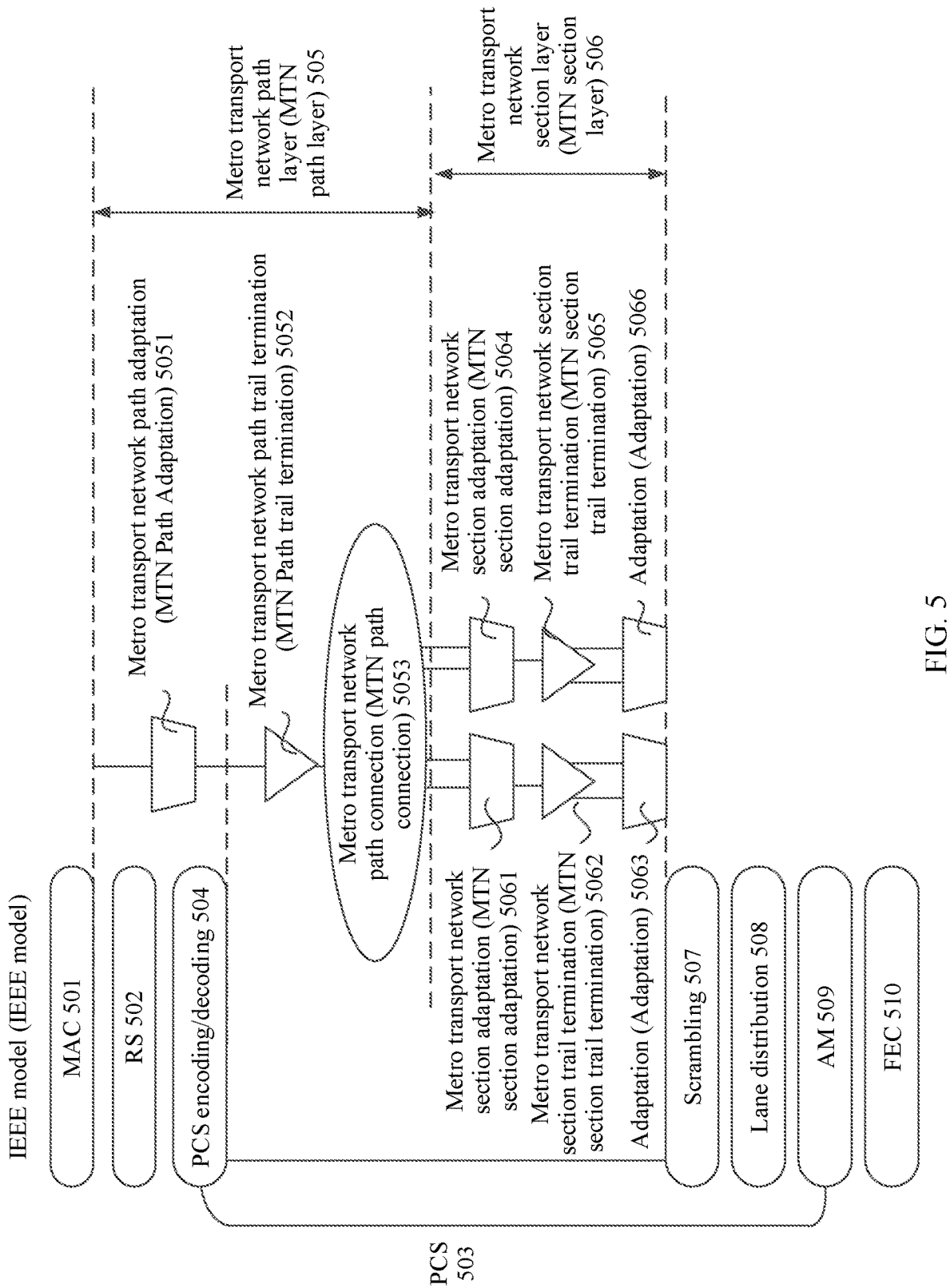
FIG. 5 is a schematic diagram of a structure of an MTN network according to an embodiment of this application.

The following descriptions in embodiments of this application are provided by using an MTN network as an example. FIG. 5 is a schematic diagram showing an example of a structure of a metro transport network (MTN). As shown in FIG. 5, the MTN network includes: an MTN path adaptation 5051, an MTN path trail termination 5052, an MTN path connection 5053, an MTN section adaptation 5061, and an MTN section trail termination 5062.

As shown in FIG. 5, when the node is configured to send data, a data stream received by the node sequentially passes through a MAC 501, an RS 502, and an RS 502, enters the MTN path adaptation 5051 in an MTN domain, and is encoded by a PCS encoding/decoding module 504 (the PCS encoding/decoding module 504 is configured to encode data in a data sending process), to obtain a client signal in a form of a 64B/66B block stream. After the 64B/66B block stream enters the MTN path trail termination 5052, overhead information such as path OAM is inserted into the block stream. The block stream is forwarded based on a corresponding port and timeslot that are found by the MTN path connection 5053. Then, the block stream enters the MTN section adaptation 5061, and the block stream is interleaved with another block stream through rate adaptation. Overhead information such as section OAM is inserted into an interleaved block stream at the MTN section trail termination 5062, and then the block stream after adaptation enters a bottom layer PHY for transmission. It should be noted that an adaptation function 5063 is not a function in the MTN domain. After adaptation, the block stream is transcoded from 64B/66B to 256B/257B at an RS-FEC 510. A transcoded stream is sent to a physical link for transmission.

In a sending process, an MTN path layer 505 may include a plurality of MTN path clients 5051. The MTN path client 5051 is configured to perform adaptation on the client signal. An MTN path 5052 is configured to insert some overhead information into the client signal. The overhead information inserted by the MTN path 5052 is referred to as first overhead information. The first overhead information may include operation, administration, and maintenance (OAM) information. An MTN path 5053 is configured to find corresponding forwarding information for forwarding each block stream, that is, find a correspondence between an egress port and an ingress port in the MTN path 5053, and find the egress port. The MTN path 5053 has one or more egress ports, and each egress port correspondingly outputs a plurality of MAC block streams. FIG. 5 shows two egress ports. Each egress port outputs a plurality of MAC block streams. A plurality of MAC block streams output by one egress port enter the MTN section 5061, and a plurality of MAC block streams output by the other egress port enter an MTN section 5064.

The MTN section 5061 is configured to perform adaptation from the MTN path layer 505 to the MTN section layer 506, and interleave the received block streams. Herein, all MAC block streams are interleaved into one block stream. The MTN section 5062 is further configured to insert second overhead information into the interleaved block stream. The second overhead information in this embodiment of this application may include section OAM and other function overhead information. An MTN section 5063 is configured to perform adaptation from the MTN section layer 506 to the medium layer. A scrambling module 507 is configured to scramble the interleaved block stream. Then, a scrambled block stream enters the FEC 510 after passing through a lane distribution (lane distribution) function module 508 and an alignment mark (AM) insertion function module 509. The FEC 510 is configured to convert a coding format of the received interleaved block stream (for example, convert a 64B/66B block stream into a 256B/257B block stream), and perform FEC encoding or decoding and error correction on a block stream obtained through format conversion. It may also be described as follows: In a sending direction, the block stream is sent to a lower layer after FEC encoding, and in a receiving direction, the block stream is sent to an upper layer after FEC decoding and error correction.

Correspondingly, the MTN section 5064 performs processing similar to processing performed by 5061.

As shown in FIG. 5, when the node is configured to receive a data stream, the data stream received by the node sequentially passes through the FEC 501, the MTN section layer 506, and the like.

In a receiving process, after receiving a block stream, the FEC 510 first performs FEC, and then converts a coding format of the block stream (for example, converts a 256B/257B block stream into a 64B/66B block stream). Then, the block stream enters the MTN section layer, and after being processed and de-interleaved by the section layer, the block stream is restored to individual 64B/66B MAC block streams at the MTN section adaptation 5064. Then, each 64B/66B block stream is forwarded at the MTN path connection 5053.

According to the solution provided in this embodiment of this application, an invalid block in a block stream can be checked. In this improved solution, an invalid block check may be performed in a sending module, may be performed in a receiving module, or may be performed in both a sending module and a receiving module of a node. In other words, the improved solution in this embodiment of this application relates to a sending module and a receiving module. Each node has a sending module and a receiving module. For each node, the sending module of the node may be a sending module that can perform embodiments of this application, and the receiving module of the node may be a receiving module in the conventional technology, or may be a receiving module that can perform embodiments of this application. Alternatively, the sending module of the node may be a sending module in the conventional technology, and the receiving module of the node may be a receiving module that can perform embodiments of this application.

Figure 6:
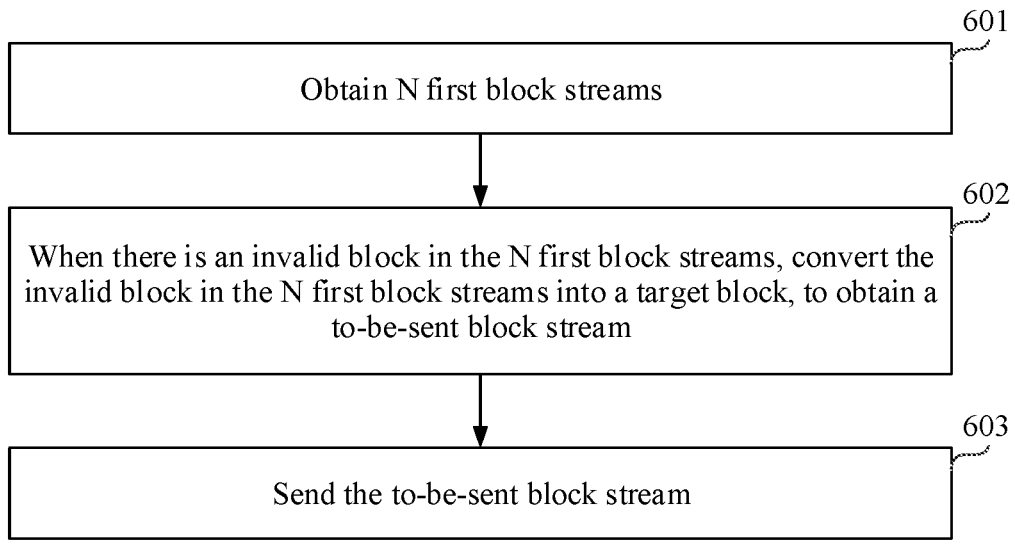
FIG. 6 is a schematic flowchart of a communication method according to an embodiment of this application.

FIG. 6 is a schematic flowchart showing an example of a communication method according to an embodiment of this application. As shown in FIG. 6, the communication method may be performed by a sending module. The sending module may be disposed in each node, for example, may be disposed in the node 407 (the node 407 may be referred to as a sending node) in FIG. 4a, and is configured to perform a data sending process; may be disposed in the node 408 (the node 408 may be referred to as an intermediate node), and is configured to perform a data sending process; or may be disposed in the node 409 (the node 409 may be referred to as a receiving node), and is configured to perform a data sending process.

Step 601: Obtain N first block streams, where N is a positive integer.

Step 602: When there is an invalid block in the N first block streams, convert the invalid block in the N first block streams into a target block, to obtain a to-be-sent block stream.

Step 603: Send the to-be-sent block stream.

In step 602, a block in the N first block streams may be checked first, and then interleaving is performed. Alternatively, the N first block streams may be interleaved first, and then an invalid block in an interleaved block stream is checked. A coding format of the interleaved block stream in which the invalid block is checked is converted, to allow compressed data and reduced overheads.

In step 602, in a first optional embodiment, the invalid block in the block stream is checked before interleaving. Specifically, when there is an invalid block in the N first block streams, the invalid block in the N first block streams is converted into a target block. The N first block streams in which the invalid block is converted into the target block are interleaved, to obtain the to-be-sent block stream. In this embodiment, optionally, that the N first block streams in which the invalid block is converted into the target block are interleaved, to obtain the to-be-sent block stream includes: interleaving the N first block streams in which the invalid block is converted into the target block, to obtain an interleaved block stream; and converting a coding format of the interleaved block stream from a first coding format to a second coding format, to obtain the to-be-sent block stream. A coding format of the N first block streams is the first coding format.

In step 602, in a second optional embodiment, the invalid block in the block stream is checked after interleaving. Specifically, the N first block streams are interleaved, to obtain an interleaved block stream. When there is an invalid block in the interleaved block stream, the invalid block in the interleaved block stream is converted into a target block, to obtain the to-be-sent block stream. In this embodiment, optionally, when there is an invalid block in the interleaved block stream, that the invalid block in the interleaved block stream is converted into a target block, to obtain the to-be-sent block stream includes: when there is an invalid block in the interleaved block stream, converting the invalid block in the interleaved block stream into a target block; and converting a coding format of the interleaved block stream in which the invalid block is converted into the target block from a first coding format to a second coding format, to obtain the to-be-sent block stream. A coding format of the N first block streams is the first coding format.

Figure 7A:
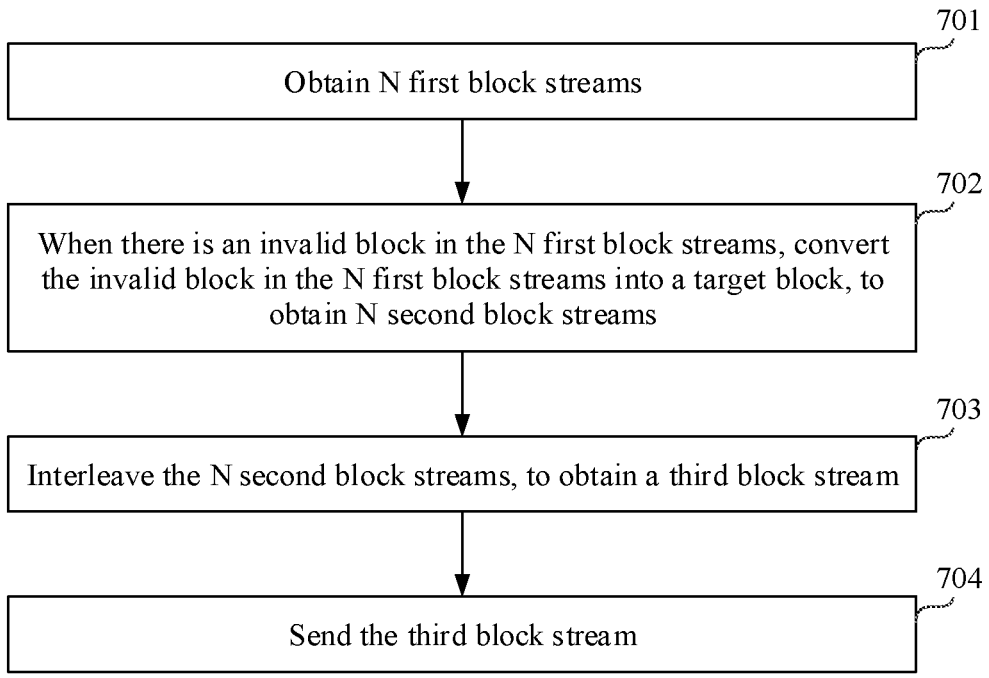
FIG. 7a is a schematic flowchart of a communication method according to an embodiment of this application.
Figure 8A:
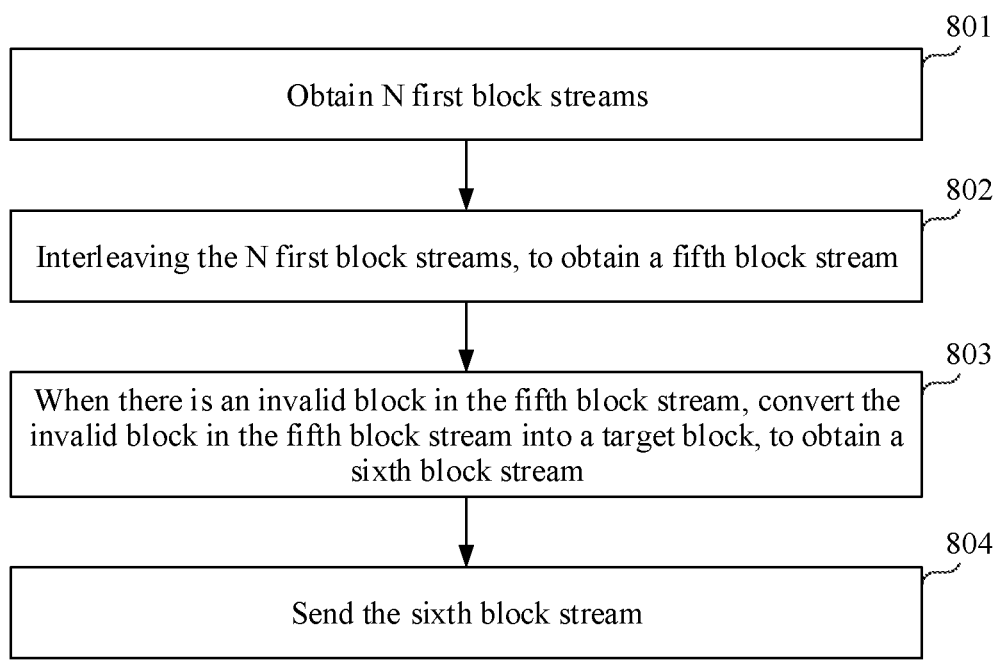
FIG. 8a is a schematic flowchart of a communication method according to an embodiment of this application.

The following describes the two embodiments of step 602 with reference to FIG. 7a and FIG. 8a respectively. FIG. 7a is a schematic flowchart showing an example of a communication method. This solution is performed by a sending module, and in this solution, an invalid block in a block stream is checked before interleaving. The following provides a specific description. As shown in FIG. 7a, the method includes the following steps.

Step 701: Obtain N first block streams, where N is a positive integer.

Step 702: When there is an invalid block in the N first block streams, convert the invalid block in the N first block streams into a target block, to obtain N second block streams.

Step 703: Interleave the N second block streams, to obtain a third block stream.

Step 704: Send the third block stream.

Figures 1, 7B:
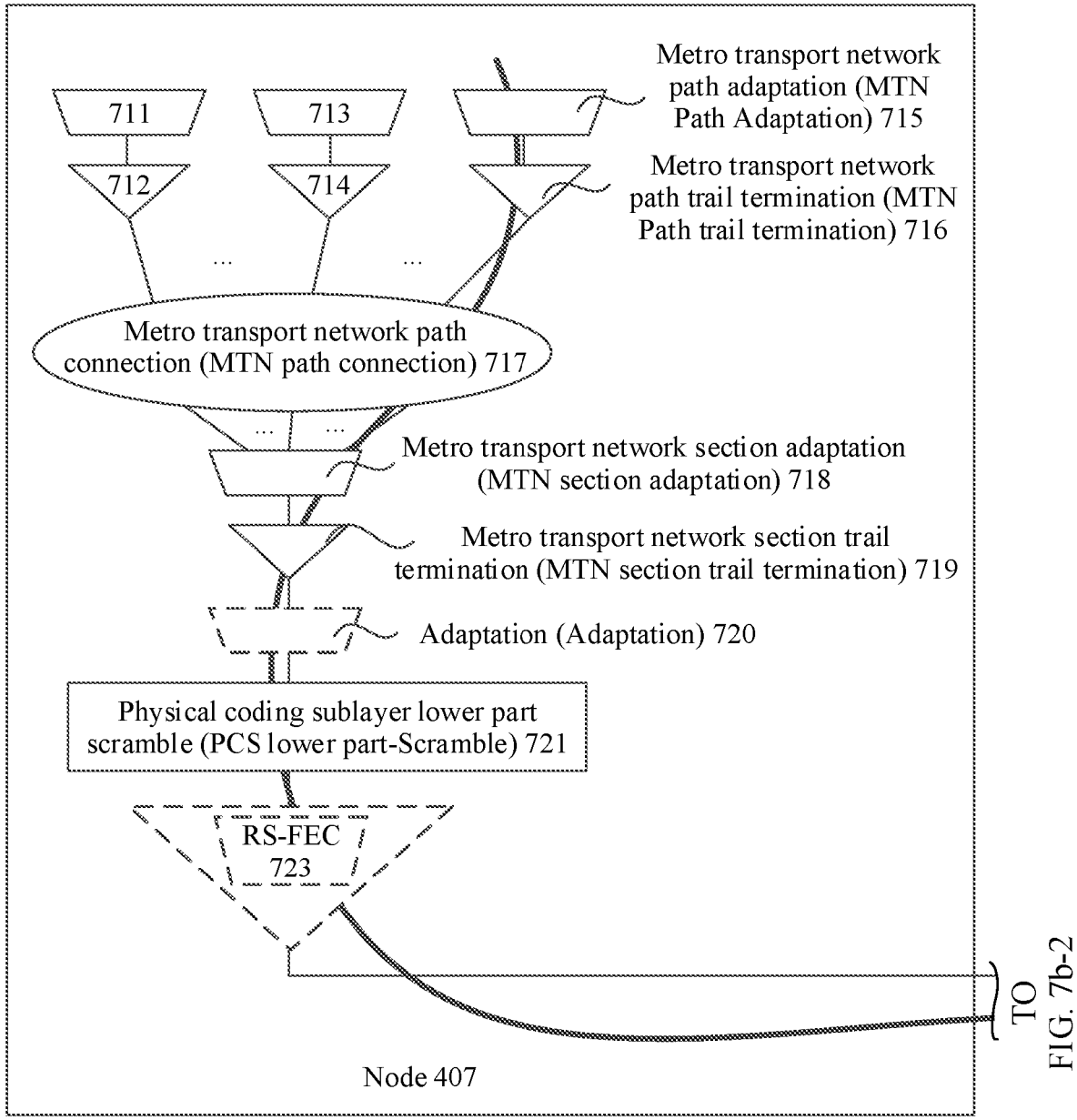
Figures 2, 7B:
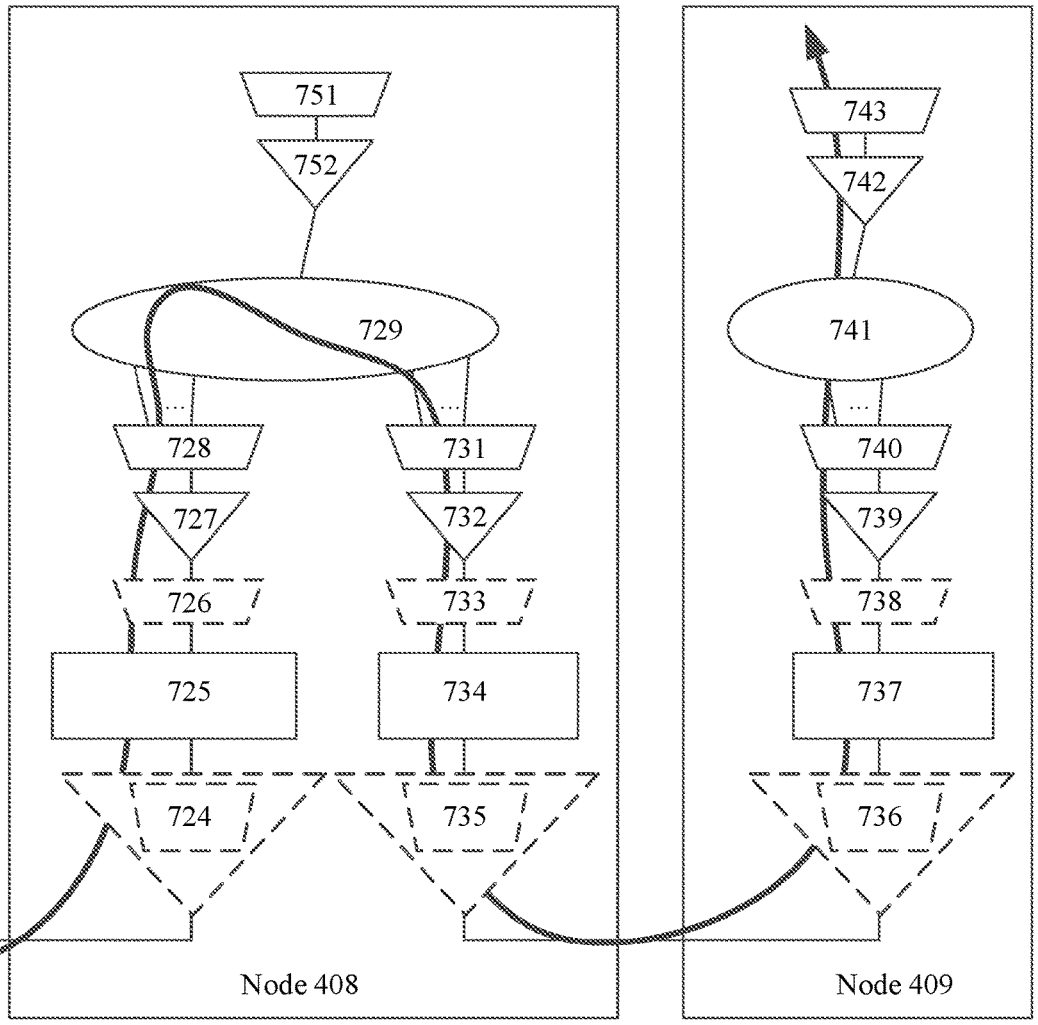

FIG. 7b-1 to FIG. 7b-3 are a schematic diagram showing an example of a data stream transmission process. As shown in FIG. 7b-1 to FIG. 7b-3, a node 407, a node 408, and a node 409 are included. The node 407 serves as a sending node, the node 408 serves as an intermediate node, and the node 409 serves as a receiving node.

For the sending node, the node 407 may interleave data streams of a plurality of MAC services, to obtain one block stream, and transmit the block stream to the node 408. For the data transmission process, refer to the data sending process described in FIG. 5. The following provides a brief description again. An MTN path adaptation 711 performs client signal adaptation, and outputs a block stream to an MTN path trail termination 712. The MTN path trail termination 712 inserts first overhead information into the received block stream, and input a block stream into which the first overhead information is inserted to an MTN path connection 717, to search for a corresponding timeslot and a corresponding egress port for forwarding based on a block or a block stream (for example, a 64B/66B format). Similarly, an MTN path adaptation 713 performs client signal adaptation, and outputs a block stream to an MTN path trail termination 714. The MTN path trail termination 714 inserts first overhead information into the received block stream, and input a block stream into which the first overhead information is inserted to an MTN path connection 717, to search for a corresponding timeslot and a corresponding egress port for forwarding based on a block or a block stream (for example, a 64B/66B format). An MTN path adaptation 715 performs client signal adaptation, and outputs a block stream to an MTN path trail termination 716. The MTN path trail termination 716 inserts first overhead information into the received block stream, and input a block stream into which the first overhead information is inserted to the MTN path connection 717, to search for a corresponding timeslot and a corresponding egress port for forwarding based on a block or a block stream (for example, a 64B/66B format).

In the sending node, the MTN path connection 717 may send the received block stream through one or more egress ports. Two egress ports are used as an example for description in FIG. 5, and only one egress port is used as an example for description in FIG. 7b-1 to FIG. 7b-3. A function is similar to that in the data sending process in FIG. 5. The MTN path connection 717 sends block streams corresponding to a plurality of MAC data streams to an MTN section adaptation 718, to perform adaptation from an MTN path layer to an MTN section layer, and the MTN section adaptation 718 further performs an interleaving operation on the received plurality of block streams. After receiving a block stream output by the MTN section adaptation 718, an MTN section trail termination 719 inserts second overhead information into the block stream. After receiving a block stream into which the second overhead information is inserted, an adaptation 720 performs adaptation from the MTN section layer to a medium layer on the block stream. Then, a PCS lower part scramble 721 performs scrambling processing on the received block stream. An RS-FEC 723 may perform FEC, or may perform coding conversion.

Specifically, coding conversion refers to conversion from a first coding format to a second coding format (in this embodiment of this application, converting a coding format from the first coding format to the second coding format may be referred to as transcoding, and in this embodiment of this application, an example in which the first coding format is a 64B/66B coding format and the second coding format is a 256B/257B coding format is used for description). A coding format of a block stream output by the RS-FEC 723 is the second coding format. For the sending node, in an optional embodiment, a coding format of a first block stream in the N first block streams is the first coding format, a coding format of a second block stream in the N second block streams is the first coding format, and a coding format of the third block stream is the first coding format. The sending the third block stream includes: converting the coding format of the third block stream into the second coding format, to obtain a fourth block stream, where a coding format of the fourth block stream is the second coding format, and the first coding format and the second coding format are different coding formats; and sending the fourth block stream.

In a process of converting the coding format from the first coding format to the second coding format, specifically, M blocks in the third block stream are converted into one block in the fourth block stream, where M is an integer greater than 1. Optionally, if M is not greater than N, the M blocks in the third block stream that correspond to the one block in the fourth block stream are from M first block streams in the N first block streams, and two first block streams corresponding to any two of the M blocks are different. In other words, M blocks that are from first block streams and that correspond to one block in the block stream in the second coding format are from different M first block streams. In another optional embodiment, if M is greater than N, there are at least N blocks in the M blocks in the third block stream that correspond to the one block in the fourth block stream, the N blocks are from the N first block streams, and two first block streams corresponding to any two of the N blocks are different. In other words, at least N blocks in M blocks that are from first block streams and that correspond to one block in the block stream in the second coding format are from different N first block streams. In another optional embodiment, in a specific coding format conversion process, there are a plurality of block streams in the first coding format. In a process of converting the block streams in the first coding format into block streams in the second coding format, a block may be obtained from each block stream in the first coding format in turn. One or more blocks may be obtained from each block stream in the first coding format at a time, and a quantity is not limited. For example, one block may be obtained from the block stream in the first coding format, and two blocks may be obtained from the block stream in the second coding format. In this case, the M blocks in the third block stream that correspond to the one block in the fourth block stream are from one or more block streams in the N first block streams.

For the intermediate node, the block stream sent by the node 407 and received by the node 408 first enters an RS-FEC module 724, and the RS-FEC 724 may perform FEC, or may perform coding conversion. Specifically, coding conversion refers to conversion from the second coding format to the first coding format (in this embodiment of this application, converting a coding format from the second coding format to the first coding format may be referred to as inverse transcoding). A coding format of a block stream output by the RS-FEC 724 is the first coding format. An inverse-transcoded data stream enters a PCS lower part de-scramble 725 for descrambling processing. A descrambling-processed block stream enters an adaptation 726 for adaptation from the medium layer to the MTN section layer, and then an MTN section trail termination 727 performs an operation of extracting the second overhead information. Then, an MTN section 728 performs adaptation from the MTN section layer to the path layer on a received block stream. The MTN section adaptation 728 further performs a de-interleaving operation on the received data stream, and inputs a plurality of block streams obtained through de-interleaving into an MTN path connection 729 for forwarding based on a block or a block stream (for example, the 64B/66B format).

After the interleaved block stream received by the intermediate node is de-interleaved, a de-interleaved block stream enters the MTN path connection 729 and does not flow to an upper layer (for example, a PCS layer). After a corresponding egress port is found in the MTN path connection 729, the de-interleaved block stream is directly exchanged and sent. On the other hand, in addition to an interleaved block stream sent by another node, the node 408 may further receive a data stream sent by another client. For example, in FIG. 4a, in addition to the data stream sent by the node 407, the node 408 further receives a data stream sent by the client 403. As shown in FIG. 7b-1 to FIG. 7b-3, a data stream output by an MTN path adaptation 751 enters the MTN path connection 729 through an MTN path trail termination 752. For the client connected to the node 408, the node 408 is a sending node of the client. Therefore, a process in which the node 408 receives the data stream sent by the client is similar to a process in which the node 407 receives the data stream from the client. In other words, each node may forward a data stream from a client or a data stream from another node based on a block or a block stream (for example, the 64B/66B format). During forwarding based on a block or a block stream (for example, the 64B/66B format), the node may mutually forward all data streams received by the node.

As shown in FIG. 7b-1 to FIG. 7b-3, the data stream of the client 403 enters the MTN path connection 729 of the node 408 (this process is similar to a process in which the data stream enters the MTN path connection 717, and details are not described herein again). The MTN path connection 729 searches for a switching timeslot and an egress port for the plurality of block streams input by the MTN section adaptation 728 and a block stream corresponding to the client 403, and outputs the block streams from the corresponding port. For example, the MTN path connection 729 outputs the plurality of block streams to an MTN section adaptation 731, to perform adaptation from the MTN path layer to the MTN section layer, and the MTN section adaptation 731 further performs an interleaving operation on the received plurality of block streams. After receiving a block stream output by the MTN section adaptation 731, an MTN section trail termination 732 inserts second overhead information into the block stream. After receiving a block stream into which the second overhead information is inserted, an adaptation 733 performs adaptation from the MTN section layer to the medium layer on the block stream. Then, a PCS lower part scramble 734 performs scrambling processing on the received block stream. An RS-FEC 735 may perform FEC, or may perform coding conversion. Specifically, coding conversion refers to conversion from the first coding format to the second coding format. A coding format of a block stream output by the RS-FEC 735 is the second coding format.

For the receiving node, the block stream sent by the node 408 and received by the node 409 first enters an RS-FEC module 736, and the RS-FEC 736 may perform FEC, or may perform coding conversion. Specifically, coding conversion refers to conversion from the second coding format to the first coding format. A coding format of a block stream output by the RS-FEC 736 is the first coding format. An inverse-transcoded data stream enters a PCS lower part de-scramble 737 for descrambling processing. A descrambling-processed block stream enters an adaptation 738 for adaptation from the medium layer to the MTN section layer, and then an MTN section trail termination 739 performs an operation of extracting the second overhead information. Then, an MTN section 740 performs adaptation from the MTN section layer to the path layer on a received block stream. The MTN section adaptation 740 further performs a de-interleaving operation on the received data stream, and inputs a plurality of block streams obtained through de-interleaving into an MTN path connection 741. Because the node 409 is a receiving node, the MTN path transmits the received block stream up to the MTN path connection 741, to extract the first overhead information. An MTN path adaptation 743 performs client signal adaptation on a received block stream, and finally reports the block stream to a PCS layer. The PCS layer may perform a block check. The block stream output by the PCS layer is sent to each client after subsequent processing.

In FIG. 7b-1 to FIG. 7b-3, a solid trapezoid in the figure indicates that the module has an adaptation function. The trapezoid indicates adaptation in English. For a specific definition, refer to ITU-T G.805/ITU-T G.800. A dashed trapezoid in the figure indicates that the module has at least an adaptation function, and may further include another function. The trapezoid indicates adaptation in English. For a specific definition, refer to ITU-T G.805/ITU-T G.800. A solid inverted triangle in the figure indicates that the module has a termination function. The inverted triangle indicates trail termination in English. For a specific definition, refer to ITU-T G.805/ITU-T G.800. A dashed inverted triangle in the figure indicates that the module has at least a termination function, and may further include another function. The inverted triangle indicates trail termination in English. For a specific definition, refer to ITU-T G.805/ITU-T G.800. A solid ellipse in the figure indicates that the module has a connection function. The ellipse indicates connection or subnetwork in English. For a specific definition, refer to ITU-T G.805/ITU-T G.800. A solid rectangle in the figure indicates that the module is a function module.

Figure 7C:
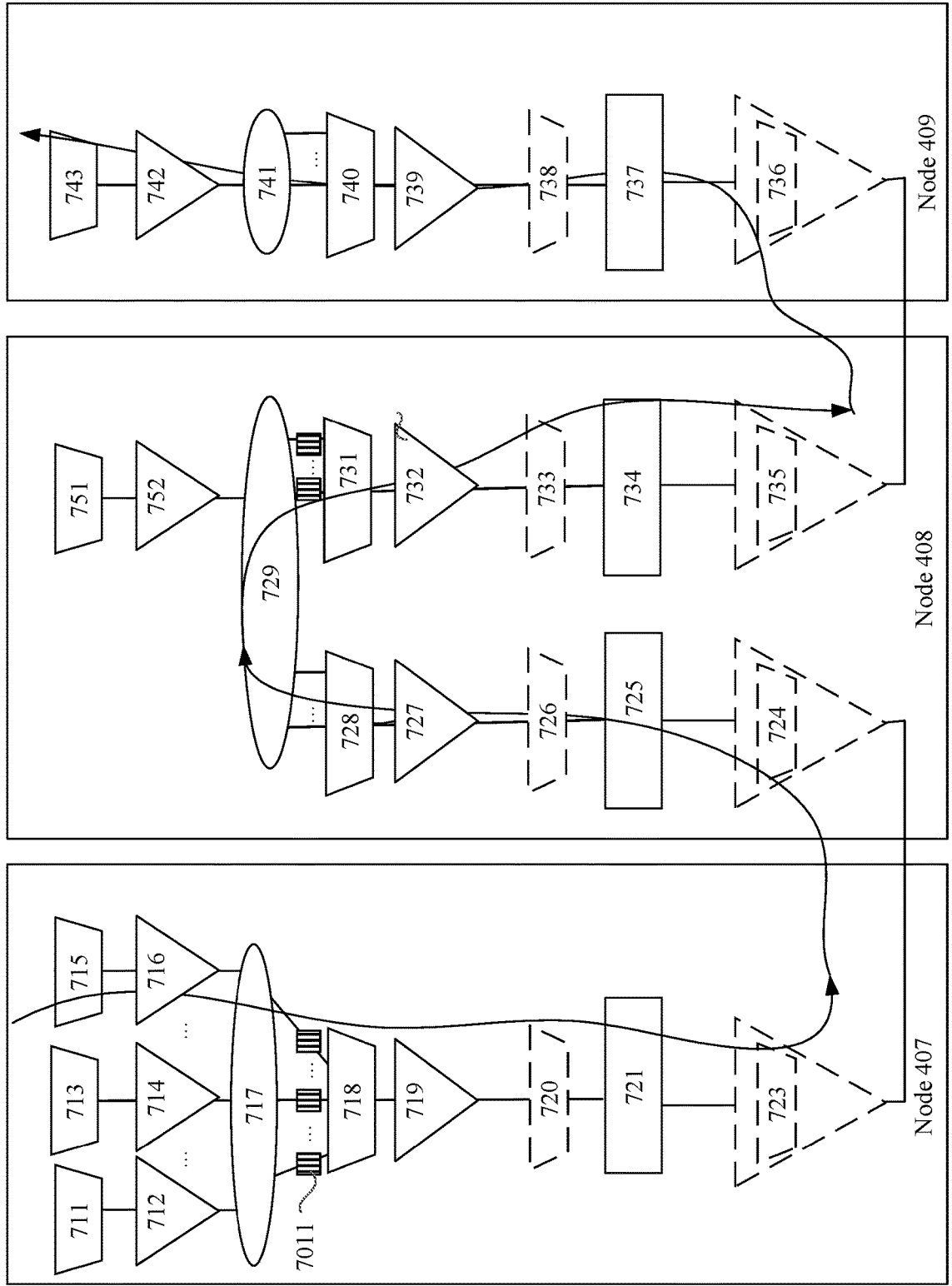

In embodiments of this application, a module that performs a step "when there is an invalid block in a block stream, convert the invalid block into a target block" is referred to as a conversion module. In the solutions shown in FIG. 7a and FIG. 7c, the conversion module specifically performs the step "when there is an invalid block in the N first block streams, convert the invalid block in the N first block streams into a target block". This step is performed before data streams are interleaved. FIG. 7c is a schematic diagram showing an example of a data stream transmission process in which a conversion module is added to FIG. 7a. As shown in FIG. 7c, a conversion module 7011 may be added before the MTN section adaptation 718. In other words, the step of converting an invalid block in the N first block streams into a target block is performed before the block streams are interleaved. Optionally, the conversion module is located after the MTN path connection 717. In other words, after first overhead information is inserted into a data stream sent by a client and before interleaving, an invalid block in a block stream is checked. Optionally, the N first block streams are block streams into which the first overhead information is inserted. In this way, a block carrying the first overhead information can be checked, so that a checked data amount is more comprehensive.

The conversion module 7011 in this embodiment of this application may be added only to the intermediate node, for example, may be added only to the node 408, but is not disposed on the sending node; or may be disposed only on the sending node, but is not disposed on the intermediate node; or as shown in FIG. 7c, may be disposed on both the sending node and the intermediate node. As shown in FIG. 7c, the conversion module 7011 is also disposed between the MTN MTN path connection 729 and the MTN section adaptation 731. For a position for disposing the conversion module 7011 on the intermediate node, refer to the foregoing description about the sending node. Details are not described herein again.

In this embodiment of this application, when a related attribute of a block is inconsistent with a definition in a standard, the block is referred to as an invalid block. Several cases of the invalid block are listed below:

Case 1: If a synchronization header area of the block is 00, the block is an invalid block.

Case 2: If a synchronization header area of the block is 11, the block is an invalid block.

Case 3: If a synchronization header area of the block is 10, and a value carried in a type field of the block is an invalid value, the block is an invalid block.

Case 4: If the block is located in an inter-frame gap and is a data block, the block is an invalid block.

Case 5: If the block is located in the middle of a frame and is a control block, the block is an invalid block.

Case 6: If a block adjacent to the block is an idle block, and the block is a data block, the block is an invalid block.

Case 7: If a block adjacent to the block is a low-power block, and the block is a data block, the block is an invalid block.

In this embodiment of this application, in addition to the foregoing seven cases, there are other cases in which a block may also be referred to as an invalid block. For example, a block sequence is defined in the standard as "(one) S block . . . , (one or more) D blocks . . . , (one) T block . . . , and (zero, or one or more) C blocks", and the sequence is a reference sequence. A block sequence is cycled based on the reference sequence. For example, a status of the block sequence in two cycles is as follows: "(one) S block . . . , (one or more) D blocks . . . , (one) T block . . . , (zero, or one or more) C blocks . . . , (one) S block . . . , (one or more) D blocks . . . , (one) T block . . . , and (zero, or one or more) C blocks . . . ". If a sequence of a block in a block stream is inconsistent with the block sequence specified in the standard, the block is an invalid block. For example, a block is a C block, but exists between an S block and a T block. In this case, the C block may be directly adjacent to the S block and the T block, there may be some D blocks between the S block and the C block, or there may be some D blocks between the C block and the T block, or the like. For another example, a block is a D block, but exists between a T block and an S block. In this case, the D block may be directly adjacent to the T block and the S block, there may be some C blocks between the T block and the D block, or there may be some C blocks between the D block and the S block, or the like.

In this embodiment of this application, the invalid block may be converted into a target block. The target block may be a block such as a data block or an error block. The target block may alternatively be another valid block. The target block may alternatively include blocks in some predefined structural forms. The preset block may further include but is not limited to the following blocks:

type 1: a block including a synchronization header 0b10, a type field 0x1E, and a payload (C0 to C7) field of another preset value;

type 2: a block including a synchronization header 0b10, a type field 0x4b, and a payload (C0 to C7) field of another preset value;

type 3: a block including a synchronization header 0b10, a type field 0x33, and a payload (C0 to C7) field of another preset value;

type 4: a block including a synchronization header 0b10, a type field 0x55, and a payload (C0 to C7) field of another preset value; and type 5: a block including a synchronization header 0b10, a type field 0x66, and a payload (C0 to C7) field of another preset value.

In this embodiment of this application, the type 1 to the type 5 are merely examples. The target block may alternatively be a control block whose type field is another value.

For each case in which an invalid block is generated, the invalid block may be converted into an error block or a data block. Details are as follows:

Processing case 1: When the synchronization header area of the block is 00, the block is converted into a data block. In this way, the block can be prevented from contaminating another block stream.

Processing case 2: When the synchronization header area of the block is 00, the block is converted into an error block. In this way, the block can be prevented from contaminating another block stream.

Processing case 3: When the synchronization header area of the block is 11, the block is converted into a data block. In this way, the block can be prevented from contaminating another block stream.

Processing case 4: When the synchronization header area of the block is 11, the block is converted into an error block. In this way, the block can be prevented from contaminating another block stream.

Processing case 5: When the synchronization header area of the block is 10, and the value carried in the type field of the block is an invalid value, the block is converted into a data block.

Processing case 6: When the synchronization header area of the block is 10, and the value carried in the type field of the block is an invalid value, the block is converted into an error block. In this way, the block can be prevented from contaminating another block stream.

Processing case 7: When the block is located in an inter-frame gap and is a data block, the block is converted into an error block. In this way, a block at a position at which an error occurs can be prevented from being mistakenly received in the case of the error.

Processing case 8: When the block is located in the middle of a frame and is a control block, the block is converted into a data block. When a block is in the middle of a frame, a synchronization header area of the block may change to 10 due to a bit error or another reason. Therefore, when a synchronization header of the block is replaced with 01 in this embodiment of this application, the block may be modified to a correct block.

Processing case 9: When the block is located in the middle of a frame and is a control block, the block is converted into an error block. In this way, the block can be prevented from contaminating another block stream.

Processing case 10: When the block adjacent to the block is an idle block, and the block is a data block, the block is converted into an error block. In this way, a block at a position at which an error occurs can be prevented from being mistakenly received in the case of the error.

Processing case 11: When the block adjacent to the block is a low-power block, and the block is a data block, the block is converted into an error block. In this way, a block at a position at which an error occurs can be prevented from being mistakenly received in the case of the error.

Processing case 12: When a sequence of the block is inconsistent with the block sequence defined in the standard, and the block is not a data block, the block is converted into a data block. In this way, a block at a position at which an error occurs can be prevented from being mistakenly received in the case of the error, and impact on link quality detection and statistics collection on a BIP check result can be avoided.

Processing case 13: When a sequence of the block is inconsistent with the block sequence defined in the standard, the block is converted into an error block. In this way, a block at a position at which an error occurs can be prevented from being mistakenly received in the case of the error.

The processing case 1 to the processing case 13 may be randomly selected and combined for use, for example, the processing case 1 and the processing case 4 may be selected and combined for use.

Further, optionally, in this embodiment of this application, the following embodiments are provided for the invalid block.

In a first embodiment, when the synchronization header area of the block is 00 or 11, and the block is located in the middle of a frame, a synchronization header of the block is replaced with 01. When a block is in the middle of a frame, a synchronization header area of the block may change to 00 or 11 due to a bit error. Therefore, when a synchronization header of the block is replaced with 01 in this embodiment of this application, the block may be modified to a correct block.

In a second embodiment, when the synchronization header area of the block is 10, the value carried in the type field of the block is an invalid value, and the block is located in the middle of a frame, a synchronization header of the block is replaced with 01. When a block is in the middle of a frame, a synchronization header area of the block may change to 10 due to a bit error or another reason. Therefore, when a synchronization header of the block is replaced with 01 in this embodiment of this application, the block may be modified to a correct block.

In a third embodiment, when the synchronization header area of the block is 00 or 11, and the block is located in an inter-frame gap, the block is replaced with an error block. When a block is located in an inter-frame gap, the block is directly replaced with an error block in this embodiment of this application, to prevent the block from contaminating another block stream.

In a fourth embodiment, when the synchronization header area of the block is 10, the value carried in the type field of the block is an invalid value, and the block is located in an inter-frame gap, the block is replaced with an error block. When a block is located in an inter-frame gap, the block is directly replaced with an error block in this embodiment of this application. This can prevent the block from contaminating another block stream.

FIG. 8a is a schematic flowchart showing an example of a communication method. This solution is performed by a sending module, and in this solution, an invalid block in a block stream is checked after interleaving. The following provides a specific description. As shown in FIG. 8a, the method includes the following steps.

Step 801: Obtain N first block streams, where N is a positive integer.

Step 802: Interleave the N first block streams, to obtain a fifth block stream.

Step 803: When there is an invalid block in the fifth block stream, convert the invalid block in the fifth block stream into a target block, to obtain a sixth block stream.

Step 804: Send the sixth block stream.

Figure 8B:
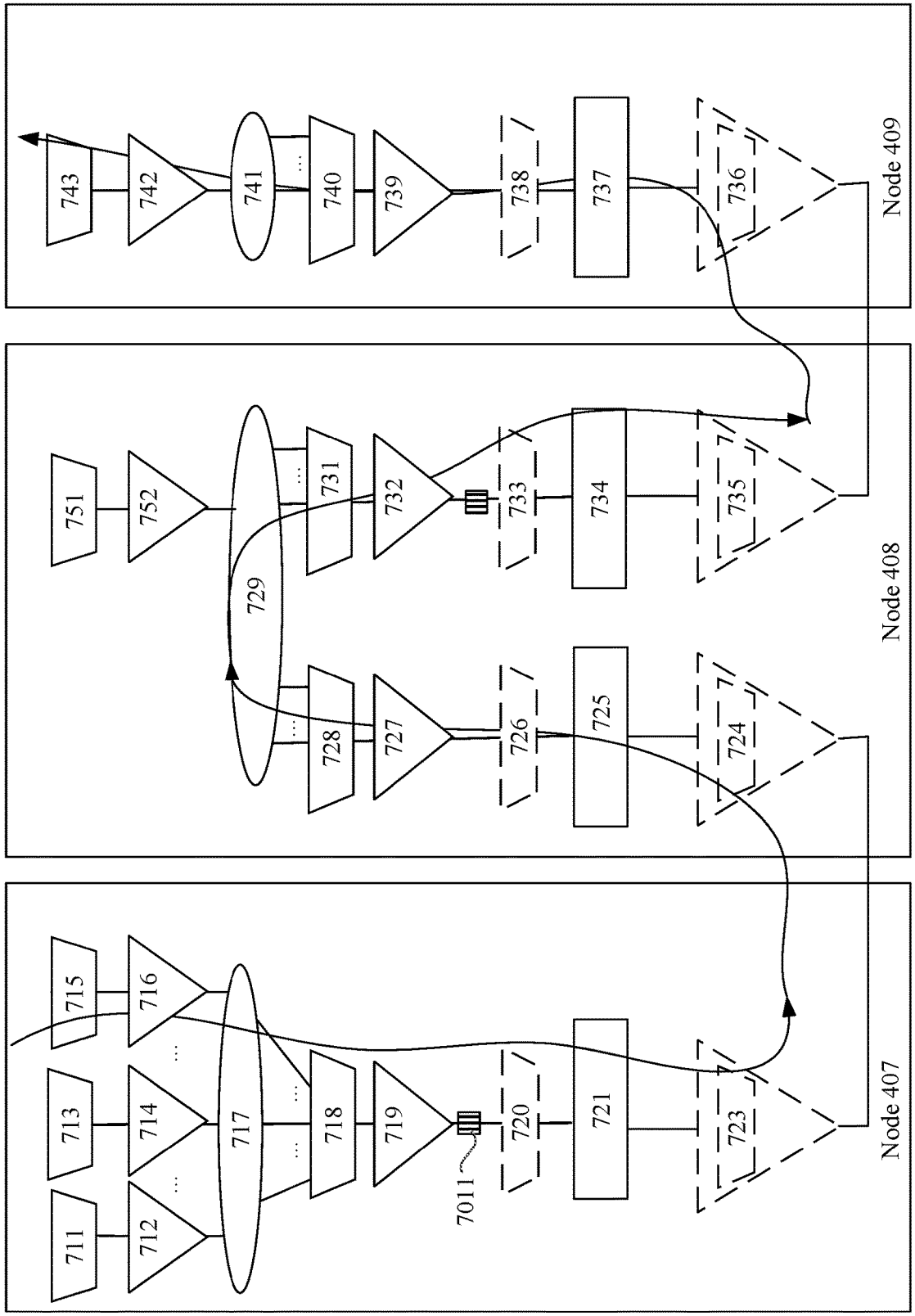

Based on the schematic diagram of the data stream transmission process shown in FIG. 7b-1 to FIG. 7b-3, FIG. 8b is a schematic diagram showing an example of a data stream transmission process in which a conversion module is added to FIG. 7b-1 to FIG. 7b-3. FIG. 8b is a schematic diagram of a data stream transmission process in FIG. 8a. As shown in FIG. 8b, an RS-FEC 723 of a sending node may perform FEC, or may perform coding conversion.

Specifically, coding conversion refers to conversion from a first coding format to a second coding format (in this embodiment of this application, converting a coding format from the first coding format to the second coding format may be referred to as transcoding, and in this embodiment of this application, an example in which the first coding format is a 64B/66B coding format and the second coding format is a 256B/257B coding format is used for description). A coding format of a block stream output by the RS-FEC 723 is the second coding format. For the sending node, in an optional embodiment, a coding format of a first block stream in the N first block streams is the first coding format, a coding format of the fifth block stream is the first coding format, and a coding format of the sixth block stream is the first coding format. The sending the sixth block stream includes: converting the coding format of the sixth block stream into the second coding format, to obtain a seventh block stream, where a coding format of the seventh block stream is the second coding format, and the first coding format and the second coding format are different coding formats; and sending the seventh block stream.

In a process of converting the coding format from the first coding format to the second coding format, specifically, the converting the coding format of the sixth block stream into the second coding format, to obtain a seventh block stream includes: converting M blocks in the sixth block stream into one block in the seventh block stream, where M is an integer greater than 1.

Optionally, if M is not greater than N, the M blocks in the sixth block stream that correspond to the one block in the seventh block stream are from M first block streams in the N first block streams, and two first block streams corresponding to any two of the M blocks are different. In other words, M blocks that are from first block streams and that correspond to one block in the block stream in the second coding format are from different M first block streams.

In another optional embodiment, if M is greater than N, there are at least N blocks in the M blocks in the sixth block stream that correspond to the one block in the seventh block stream, the N blocks are from the N first block streams, and two first block streams corresponding to any two of the N blocks are different. In other words, at least N blocks in M blocks that are from first block streams and that correspond to one block in the block stream in the second coding format are from different N first block streams. In another optional embodiment, in a specific coding format conversion process, there are a plurality of block streams in the first coding format. In a process of converting the block streams in the first coding format into block streams in the second coding format, a block may be obtained from each block stream in the first coding format in turn. One or more blocks may be obtained from each block stream in the first coding format at a time, and a quantity is not limited. For example, one block may be obtained from the block stream in the first coding format, and two blocks may be obtained from the block stream in the second coding format. In this case, the M blocks in the third block stream that correspond to the one block in the fourth block stream are from one or more block streams in the N first block streams.

In embodiments of this application, a module that performs a step "when there is an invalid block in a block stream, convert the invalid block into a target block" is referred to as a conversion module. In the solutions shown in FIG. 8a and FIG. 8b, the conversion module specifically performs the step "when there is an invalid block in the fifth block stream, convert the invalid block in the fifth block stream into a target block". This step is performed after data streams are interleaved. FIG. 8b is a schematic diagram showing an example of a data stream transmission process in which a conversion module is added to FIG. 7a. As shown in FIG. 8b, a conversion module 7011 may be added after an MTN section adaptation 718. In other words, the step of converting the invalid block into a target block is performed after the block streams are interleaved. Optionally, the conversion module 7011 is located after an MTN section trail termination 719. In other words, after data streams sent by a client are interleaved and second overhead information is inserted, an invalid block in a block stream is checked. Optionally, the fifth block stream is a block stream into which the second overhead information is inserted. In this way, a block carrying the second overhead information can be checked, so that a checked data amount is more comprehensive. In another optional embodiment, it may be limited that a position of the conversion module 7011 is before a position for scrambling, and the fifth block stream is a block stream before scrambling. Specifically, the conversion module 7011 may be located after the MTN section adaptation 718 and before a PCS lower part scramble 721. In another optional embodiment, it may be limited that a position of the conversion module 7011 is before a position for scrambling and after a position for inserting the second overhead information. The fifth block stream is a block stream that exists before scrambling and into which the second overhead information is inserted. Specifically, the conversion module 7011 may be located after the MTN section trail termination 719 and before the PCS lower part scramble 721.

The conversion module 7011 in this embodiment of this application may be added only to an intermediate node, for example, may be added only to a node 408, but is not disposed on the sending node; or may be disposed only on the sending node, but is not disposed on the intermediate node; or as shown in FIG. 8b, may be disposed on both the sending node and the intermediate node. As shown in FIG. 8b, the conversion module 7011 is also disposed between an MTN section trail termination 732 and an adaptation 733. For a position for disposing the conversion module 7011 on the intermediate node, refer to the foregoing description about the sending node. Details are not described herein again.

For a related description of the invalid block in this embodiment of this application, refer to the related descriptions of the solutions in FIG. 7a, FIG. 7b-1 to FIG. 7b-3, and FIG. 7c. Details are not described herein again.

Figure 9:
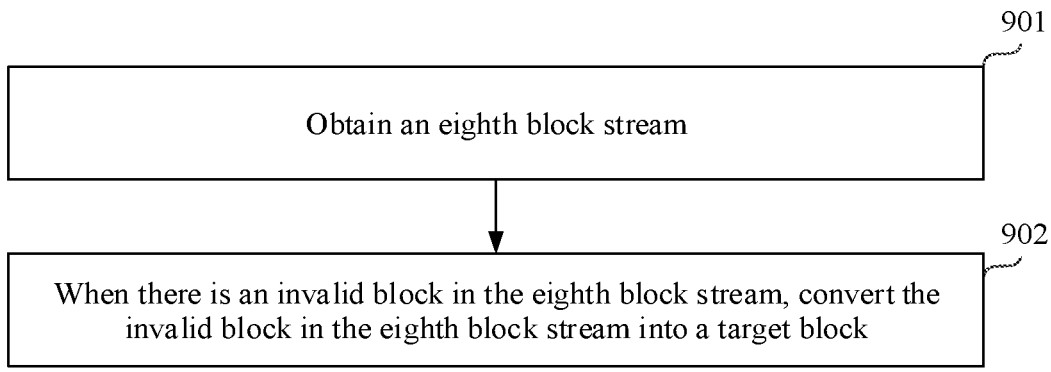
FIG. 9 is a schematic flowchart of a communication method according to an embodiment of this application.

FIG. 9 is a schematic flowchart showing an example of a communication method according to an embodiment of this application. As shown in FIG. 9, the communication method may be performed by a receiving module. The receiving module may be disposed in each node, for example, may be disposed in the node 407 (the node 407 may be referred to as a sending node) in FIG. 4a, and is configured to perform a data receiving process; may be disposed in the node 408 (the node 408 may be referred to as an intermediate node), and is configured to perform a data receiving process; or may be disposed in the node 409 (the node 409 may be referred to as a receiving node), and is configured to perform a data receiving process.

Step 901: Obtain an eighth block stream.

Step 902: When there is an invalid block in the eighth block stream, convert the invalid block in the eighth block stream into a target block.

In step 902, the eighth block stream may be de-interleaved first, and then an invalid block in block streams obtained through de-interleaving is checked. Alternatively, the invalid block in the eighth block stream may be checked first, and then the block stream in which the invalid block is checked is de-interleaved. A coding format of a received data stream may be converted, to transmit compressed data at a transmit end and restore original data at a receive end. This reduces overheads.

In step 902, in a first optional embodiment, the invalid block in the block stream is checked after de-interleaving. Specifically, when there is an invalid block in the eighth block stream, the converting the invalid block in the eighth block stream into a target block includes: de-interleaving the eighth block stream, to obtain N ninth block streams; when there is an invalid block in the N ninth block streams, converting the invalid block in the N ninth block stream into a target block, to obtain N tenth block streams; and interleaving the N tenth block streams and L other block streams, to obtain an interleaved block stream, and sending the interleaved block stream, where L is zero or a positive integer; or performing decoding processing on the N tenth block streams by using a physical coding sublayer PCS layer.

In step 902, in a second optional embodiment, the invalid block in the block stream is checked before de-interleaving. Specifically, when there is an invalid block in the eighth block stream, the converting the invalid block in the eighth block stream into a target block includes: when there is an invalid block in the eighth block stream, converting the invalid block in the eighth block stream into a target block, to obtain a twelfth block stream; de-interleaving the twelfth block stream, to obtain N thirteenth block streams; and interleaving the N thirteenth block streams and L other block streams, to obtain an interleaved block stream, and sending the interleaved block stream, where L is zero or a positive integer; or performing decoding processing on the N thirteenth block streams by using a physical coding sublayer PCS layer.

Figure 10A:
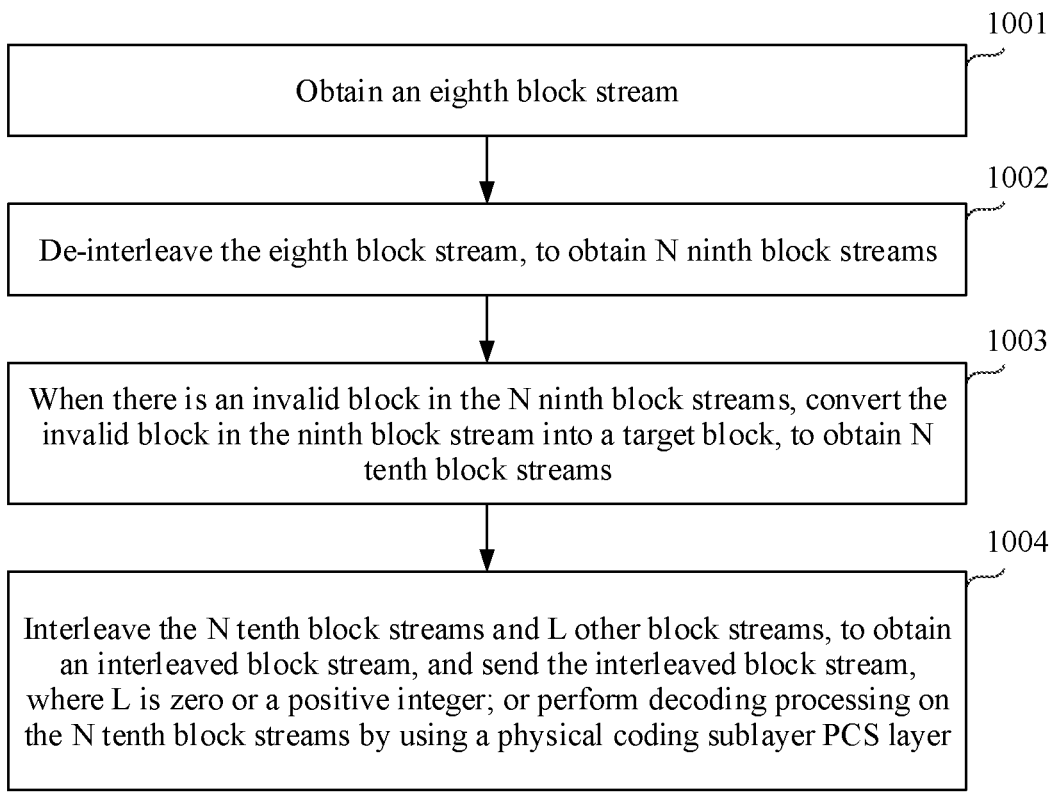
FIG. 10a is a schematic flowchart of a communication method according to an embodiment of this application.
Figure 11A:
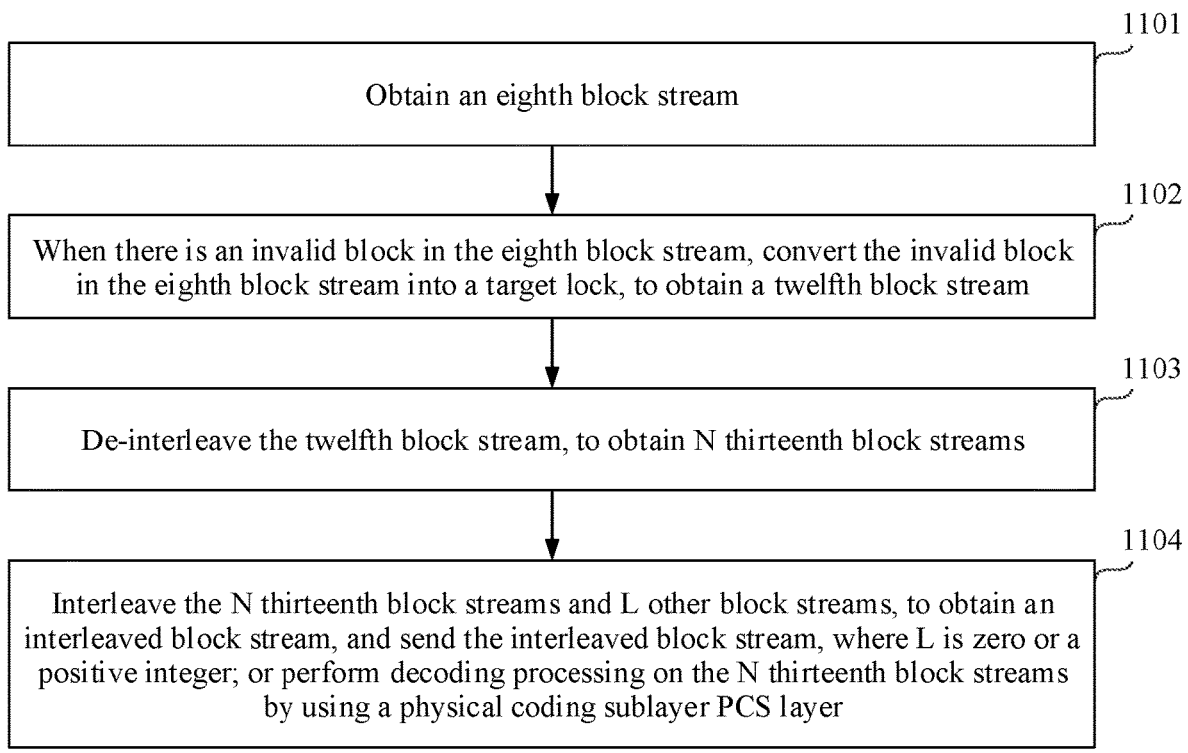
FIG. 11a is a schematic flowchart of a communication method according to an embodiment of this application.

The following describes the two embodiments of step 902 with reference to FIG. 10a and FIG. 11a respectively. FIG. 10a is a schematic flowchart showing an example of a communication method. This solution is performed by a receiving module, and in this solution, an invalid block in a block stream is checked after de-interleaving. The following provides a specific description. As shown in FIG. 10a, the method includes the following steps.

Step 1001: Obtain an eighth block stream.

Step 1002: De-interleave the eighth block stream, to obtain N ninth block streams.

Step 1003: When there is an invalid block in the N ninth block streams, convert the invalid block in the N ninth block stream into a target block, to obtain N tenth block streams.

Step 1004: Interleave the N tenth block streams and L other block streams, to obtain an interleaved block stream, and send the interleaved block stream, where L is zero or a positive integer; or perform decoding processing on the N tenth block streams by using a physical coding sublayer PCS layer.

Figure 10B:
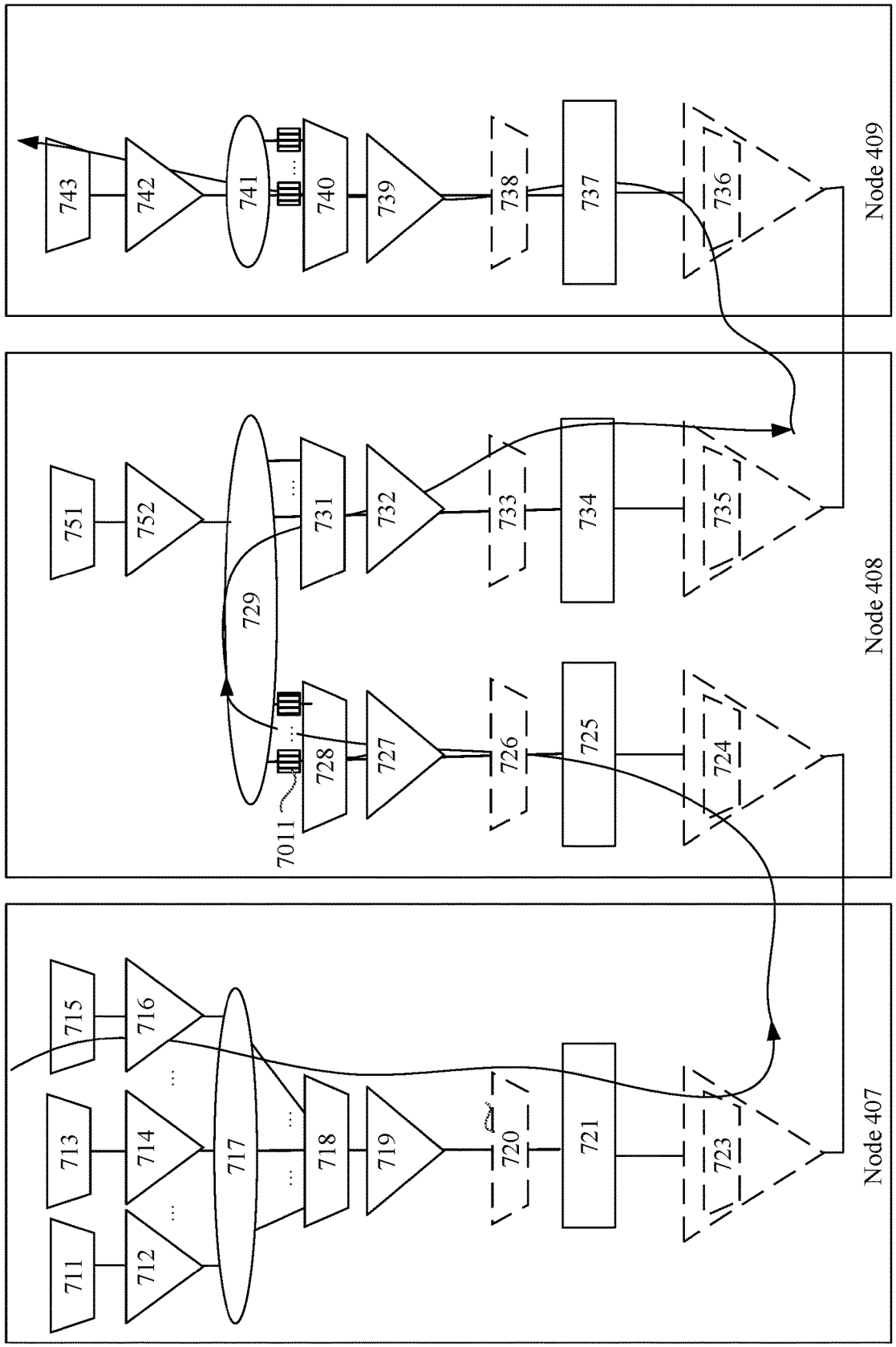

Based on the schematic diagram of the data stream transmission process shown in FIG. 7b-1 to FIG. 7b-3, FIG. 10b is a schematic diagram showing an example of a data stream transmission process in which a conversion module is added to FIG. 7b-1 to FIG. 7b-3. FIG. 10b is a schematic diagram of a data stream transmission process in FIG. 10a. As shown in FIG. 10b, both a node 408 and a node 409 have a function of executing the receiving module.

In step 1004, if the receiving module is located in an intermediate node, the node interleaves the N tenth block streams and L other block streams, to obtain an interleaved block stream, and sends the interleaved block stream, where L is zero or a positive integer. In other words, as shown in FIG. 10b, an MTN section adaption 731 in the node 408 performs interleaving processing again on block streams that are sent by other nodes and that are obtained through de-interleaving and a block stream sent by a client 403, and sends an interleaving-processed block stream. Herein, the block stream of the client 403 may be classified into another block stream.

In step 1004, when the receiving module is in a receiving node, for example, in the node 409, the block streams that are obtained through de-interleaving enter the PCS layer, and decoding processing is performed on the N tenth block streams by using the physical coding sublayer PCS layer.

The receiving module further performs a coding conversion operation. The following uses the node 408 as an example for description. After receiving a data stream, an RS-FEC 724 of the node 408 may perform FEC, or may perform coding conversion.

The RS-FEC 724 may perform FEC, or may perform coding conversion. Specifically, coding conversion refers to conversion from a second coding format to a first coding format (in this embodiment of this application, converting a coding format from the second coding format to the first coding format may be referred to as inverse transcoding). A coding format of a block stream output by the RS-FEC 724 is the first coding format. An inverse-transcoded data stream enters a PCS lower part de-scramble 725 for descrambling processing. A descrambling-processed block stream enters an adaptation 726 for adaptation from a medium layer to an MTN section layer, and then an MTN section trail termination 727 performs an operation of extracting second overhead information. Then, an MTN section 728 performs adaptation from the MTN section layer to a path layer on a received block stream. The MTN section adaptation 728 further performs a de-interleaving operation on the received data stream, and inputs a plurality of block streams obtained through de-interleaving into the MTN path connection 729 for forwarding based on a block or a block stream (for example, a 64B/66B format).

In an optional embodiment, a coding format of the eighth block stream is the first coding format, and a coding format of a ninth block stream in the N ninth block streams is the first coding format. The obtaining an eighth block stream includes: receiving an eleventh block stream, where a coding format of the eleventh block stream is the second coding format; and converting the coding format of the eleventh block stream into the first coding format, to obtain the eighth block stream.

In a process of converting the coding format from the second coding format to the first coding format, specifically, one block in the eleventh block stream is converted into M blocks in the eighth block stream, where M is an integer greater than 1. Optionally, if M is not greater than N, the M blocks correspond to M ninth block streams in the N ninth block streams, and two ninth block streams corresponding to any two of the M blocks are different. In other words, M blocks that are from ninth block streams and that correspond to one block in the block stream in the second coding format are from different M ninth block streams. In another optional embodiment, if M is greater than N, there are at least N blocks in the M blocks, the N blocks correspond to the N ninth block streams, and two ninth block streams corresponding to any two of the N blocks are different. In other words, at least N blocks in M blocks that are from first block streams and that correspond to one block in the block stream in the second coding format are from different N ninth block streams. In another optional embodiment, in a specific coding format conversion process, there are a plurality of block streams in the first coding format. In a process of converting the block streams in the first coding format into block streams in the second coding format, a block may be obtained from each block stream in the first coding format in turn. One or more blocks may be obtained from each block stream in the first coding format at a time, and a quantity is not limited. For example, one block may be obtained from the block stream in the first coding format, and two blocks may be obtained from the block stream in the second coding format. In this case, the M blocks correspond to one or more block streams in M ninth block streams in the N ninth block streams.

In embodiments of this application, a module that performs a step "when there is an invalid block in a block stream, convert the invalid block into a target block" is referred to as a conversion module. In the solutions shown in FIG. 10*a* and FIG. 10*b*, the conversion module specifically performs the step "when there is an invalid block in the N ninth block streams, convert the invalid block in the N ninth block stream into a target block". This step is performed after a data stream is de-interleaved. FIG. 10*b* is a schematic diagram showing an example of a structure in which a conversion module is added to FIG. 7*a*. As shown in FIG. 10*b*, a conversion module 7011 may be added after the MTN section adaptation 728. In other words, the step of converting the invalid block into a target block is performed after the block stream is de-interleaved.

As shown in FIG. 10*b*, the conversion module 7011 may be added after an MTN section adaptation 740. In other words, the step of converting the invalid block into a target block is performed after the block stream is de-interleaved. Optionally, the conversion module 7011 may alternatively be added before an MTN path trail termination 742. The N ninth block streams may be described as block streams before first overhead information is extracted. In this way, a block carrying the first overhead information can be checked, so that a checked data amount is more comprehensive.

The conversion module 7011 in this embodiment of this application may be added only to the intermediate node, for example, may be added only to the node 408, but is not disposed on a sending node; or may be disposed only on the sending node, but is not disposed on the intermediate node; or as shown in FIG. 8*b*, may be disposed on both the sending node and the intermediate node. As shown in FIG. 8*b*, the conversion module 7011 is also disposed between an MTN section trail termination 732 and an adaptation 733. For a position for disposing the conversion module 7011 on the intermediate node, refer to the foregoing description about the sending node. Details are not described herein again.

For a related description of the invalid block in this embodiment of this application, refer to the related descriptions of the solutions in FIG. 7*a*, FIG. 7*b*-1 to FIG. 7*b*-3, and FIG. 7*c*. Details are not described herein again.

FIG. 11*a* is a schematic flowchart showing an example of a communication method. This solution is performed by a receiving module, and in this solution, an invalid block in a block stream is checked after interleaving. The following provides a specific description. As shown in FIG. 11*a*, the method includes the following steps.

Step 1101: Obtain an eighth block stream.

Step 1102: When there is an invalid block in the eighth block stream, convert the invalid block in the eighth block stream into a target block, to obtain a twelfth block stream.

Step 1103: De-interleave the twelfth block stream, to obtain N thirteenth block streams.

Step 1104: Interleave the N thirteenth block streams and L other block streams, to obtain an interleaved block stream, and send the interleaved block stream, where L is zero or a positive integer; or perform decoding processing on the N thirteenth block streams by using a physical coding sublayer PCS layer.

Based on the schematic diagram of the data stream transmission process shown in FIG. 7*b*-1 to FIG. 7*b*-3, FIG.

Figure 11B:
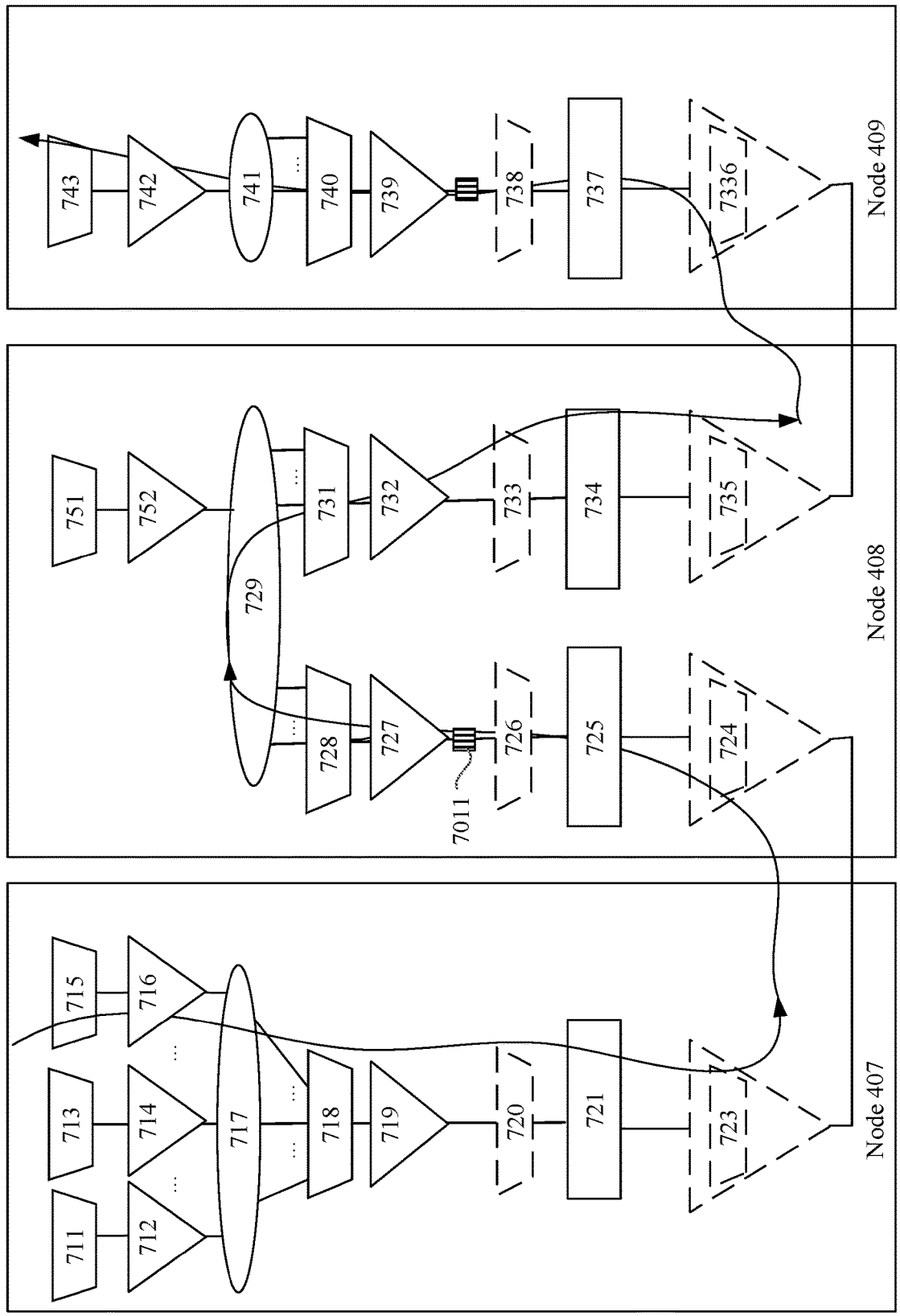

11*b* is a schematic diagram showing an example of a data process in which a conversion module is added to FIG. 7*b*-1 to FIG. 7*b*-3. FIG. 11*b* is a schematic diagram of a data stream transmission process in FIG. 11*a*. As shown in FIG. 11*b*, both a node 408 and a node 409 have a function of executing the receiving module.

In step 1104, if the receiving module is located in an intermediate node, the node interleaves the N thirteenth block streams and L other block streams, to obtain an interleaved block stream, and sends the interleaved block stream, where L is zero or a positive integer. In other words, as shown in FIG. 11*b*, an MTN section adaption 731 in the node 408 performs interleaving processing again on block streams that are sent by other nodes and that are obtained through de-interleaving and a block stream sent by a client 403, and sends an interleaving-processed block stream. Herein, the block stream of the client 403 may be classified into another block stream.

In step 1104, when the receiving module is in a receiving node, for example, in the node 409, the block streams that are obtained through de-interleaving enter the PCS layer, and decoding processing is performed on the N thirteenth block streams by using the physical coding sublayer PCS layer.

The receiving module further performs a coding conversion operation. The following uses the node 408 as an example for description. After receiving a data stream, an RS-FEC 724 of the node 408 may perform FEC, or may perform coding conversion.

Based on the schematic diagram of the data stream transmission process shown in FIG. 7*b*-1 to FIG. 7*b*-3, FIG. 11*b* is a schematic diagram showing an example of a data stream transmission process in FIG. 11*a*. As shown in FIG. 11*b*, an RS-FEC 724 of a sending node may perform FEC, or may perform coding conversion. For specific coding conversion of the eighth block stream, refer to the related descriptions in FIG. 10*a* and FIG. 10*b*. Details are not described herein again.

In embodiments of this application, a module that performs a step "when there is an invalid block in a block stream, convert the invalid block into a target block" is referred to as a conversion module. In the solutions shown in FIG. 11*a* and FIG. 11*b*, the conversion module specifically performs the step "when there is an invalid block in the eighth block stream, convert the invalid block in the eighth block stream into a target block". This step is performed before a data stream is de-interleaved. FIG. 11*b* is a schematic diagram showing an example of a structure in which a conversion module is added to FIG. 7*a*. As shown in FIG. 11*b*, a conversion module 7011 may be added before an MTN section adaptation 728. In other words, the step of converting the invalid block into a target block is performed before the block stream is de-interleaved. Optionally, the conversion module 7011 is located before an MTN section trail termination 727. In other words, before a data stream sent by a client is de-interleaved and second overhead information is extracted, an invalid block in a block stream is checked. Optionally, the eighth block stream is a block stream before the second overhead information is extracted. In this way, a block carrying the second overhead information can be checked, so that a checked data amount is more comprehensive. In another optional embodiment, it may be limited that a position of the conversion module 7011 is after a position for descrambling, and the eighth block stream is a block stream after descrambling. Specifically, the conversion module 7011 may be located before the MTN section adaptation 728 and after a PCS lower part de-scramble 725.

In another optional embodiment, it may be limited that a position of the conversion module 7011 is after a position for descrambling and before a position for extracting the second overhead information. Specifically, the conversion module 7011 may be located before the MTN section trail termination 727 and after a PCS lower part scramble 721.

The conversion module 7011 in this embodiment of this application may be added only to the intermediate node, for example, may be added only to the node 408, but is not disposed on the sending node; or may be disposed only on the sending node, but is not disposed on the intermediate node; or as shown in FIG. 8*b*, may be disposed on both the sending node and the intermediate node. As shown in FIG. 8*b*, the conversion module 7011 is also disposed between an MTN section trail termination 732 and an adaptation 733. For a position for disposing the conversion module 7011 on the intermediate node, refer to the foregoing description about the sending node. Details are not described herein again.

For a related description of the invalid block in this embodiment of this application, refer to the related descriptions of the solutions in FIG. 7*a*, FIG. 7*b*-1 to FIG. 7*b*-3, and FIG. 7*c*. Details are not described herein again.

Figure 12:
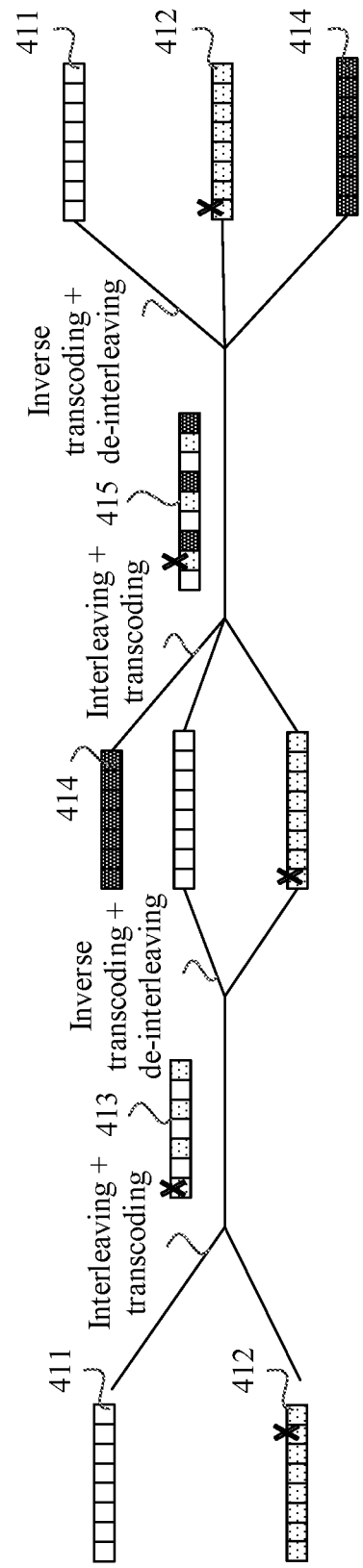
FIG. 12 is a schematic diagram of data transmission when there is an invalid block in a data stream shown in FIG. 4a, after an embodiment of this application is applied.

In the solutions shown in FIG. 7*a* to FIG. 11*b*, a node may be a sending node, an intermediate node, or a receiving node, and the node may include only the sending module in embodiments of this application, may include only the receiving module in embodiments of this application, or may include both the sending module and the receiving module in embodiments of this application. This is not limited. According to any one of the foregoing embodiments, a problem that an invalid block contaminates and spreads to another service can be avoided. FIG. 12 is a schematic diagram showing an example of an effect of applying embodiments of this application in FIG. 4*b*. As shown in FIG. 4*b*, if there is an invalid block in the block stream 412, the invalid block does not contaminate or spread to another block stream in an entire data transmission process.

Figure 13:
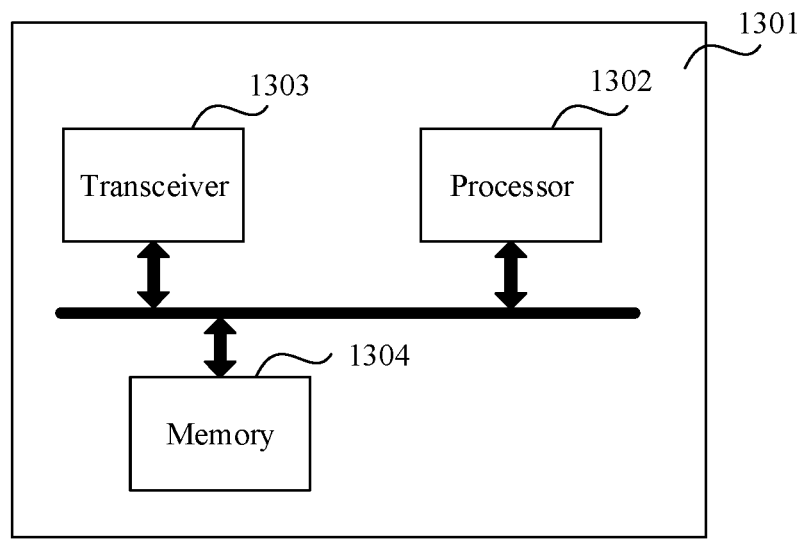
FIG. 13 is a schematic diagram of a structure of a communications device according to an embodiment of this application.

Based on the foregoing methods, FIG. 13 is a schematic diagram of a structure of a communications device 1301 according to an embodiment of this application. As shown in FIG. 13, the communications device may be a network device, or may be a chip or a circuit, for example, a chip or a circuit that may be disposed in a network device.

Further, the communications device 1301 may further include a bus system. A processor 1302, a memory 1304, and a transceiver 1303 may be connected through the bus system.

It should be understood that the processor 1302 may be a chip. For example, the processor 1302 may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

In an embodiment of an implementation process, steps in the foregoing methods may be implemented by using a hardware integrated logical circuit in the processor 1302 or by using instructions in a form of software. The steps of the methods disclosed with reference to embodiments of this application may be directly performed and completed by a hardware processor, or may be performed and completed by using a combination of hardware and software modules in the processor 1302. The software module may be located in a mature storage medium in the art, such as a random access memory, a flash memory, a read-only memory, a programmable read-only memory, an electrically erasable programmable memory, or a register. The storage medium is located in the memory 1304, and the processor 1302 reads information in the memory 1304 and completes the steps in the foregoing methods in combination with hardware of the processor 1302.

It should be noted that, the processor 1302 in this embodiment of this application may be an integrated circuit chip, and has a signal processing capability. In an embodiment of an implementation process, steps in the foregoing method embodiments may be implemented by using a hardware integrated logical circuit in the processor or by using instructions in a form of software. The foregoing processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps of the methods disclosed with reference to embodiments of this application may be directly performed and completed by a hardware decoding processor, or may be performed and completed by using a combination of hardware and software modules in a decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It may be understood that the memory 1304 in this embodiment of this application may be a volatile memory or a nonvolatile memory, or may include both the volatile memory and the nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. For example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory in the system and the method described in this specification is intended to include, but not limited to, these memories and any memory of another proper type.

The communications device 1301 includes the foregoing conversion module, configured to convert an invalid block into a target block. The communications device 1301 may be configured to perform the solution of the foregoing transmit end, or may be configured to perform the solution of the foregoing receive end. The communications device may include the processor 1302, the transceiver 1303, and the memory 1304. The memory 1304 is configured to store instructions. The processor 1302 is configured to execute the instructions stored in the memory 1304, to implement a related solution in the method corresponding to any one or more of FIG. 1 to FIG. 12.

When the communications device 1301 is configured to perform the solution of the foregoing transmit end, the communications device 1301 may be configured to perform the methods described in FIG. 6, FIG. 7a, and FIG. 8a. When the communications device 1301 is configured to perform the solution of the foregoing receive end, the communications device 1301 may be configured to perform the methods described in FIG. 9, FIG. 10a, and FIG. 11a.

In a first embodiment, when the communications device 1301 is configured to perform the solution of the foregoing transmit end, the processor is configured to: obtain N first block streams, where N is a positive integer; and when there is an invalid block in the N first block streams, convert the invalid block in the N first block streams into a target block, to obtain a to-be-sent block stream. The transceiver is configured to send the to-be-sent block stream.

When the communications device 1301 is configured to perform the solution of the foregoing transmit end, in an optional embodiment, the processor is specifically configured to: when there is an invalid block in the N first block streams, convert the invalid block in the N first block streams into a target block; and interleave the N first block streams in which the invalid block is converted into the target block, to obtain the to-be-sent block stream. In an optional embodiment, a coding format of the N first block streams is a first coding format. The processor is specifically configured to: interleave the N first block streams in which the invalid block is converted into the target block, to obtain an interleaved block stream; and convert a coding format of the interleaved block stream from the first coding format to a second coding format, to obtain the to-be-sent block stream.

When the communications device 1301 is configured to perform the solution of the foregoing transmit end, in another optional embodiment, the processor is specifically configured to: interleave the N first block streams, to obtain an interleaved block stream; and when there is an invalid block in the interleaved block stream, convert the invalid block in the interleaved block stream into a target block, to obtain the to-be-sent block stream. In an optional embodiment, a coding format of the N first block streams is a first coding format. The processor is specifically configured to: when there is an invalid block in the interleaved block stream, convert the invalid block in the interleaved block stream into a target block; and convert a coding format of the interleaved block stream in which the invalid block is converted into the target block from the first coding format to a second coding format, to obtain the to-be-sent block stream.

In a second embodiment, when the communications device 1301 is configured to perform the solution of the foregoing transmit end, the processor is configured to: obtain N first block streams, where N is a positive integer; when there is an invalid block in the N first block streams, convert the invalid block in the N first block streams into a target block, to obtain N second block streams; and interleave the N second block streams, to obtain a third block stream. The transceiver is configured to send the third block stream.

When the communications device 1301 is configured to perform the solution of the foregoing transmit end, in an optional embodiment, a coding format of a first block stream in the N first block streams is a first coding format, a coding format of a second block stream in the N second block streams is the first coding format, and a coding format of the third block stream is the first coding format. The processor is further configured to: convert the coding format of the third block stream into a second coding format, to obtain a fourth block stream, where a coding format of the fourth block stream is the second coding format, and the first coding format and the second coding format are different coding formats. The transceiver is specifically configured to send the fourth block stream.

When the communications device 1301 is configured to perform the solution of the foregoing transmit end, in an optional embodiment, the processor is specifically configured to convert M blocks in the third block stream into one block in the fourth block stream, where M is an integer greater than 1.

When the communications device 1301 is configured to perform the solution of the foregoing transmit end, in an optional embodiment, if M is not greater than N, the M blocks in the third block stream that correspond to the one block in the fourth block stream are from M first block streams in the N first block streams, and two first block streams corresponding to any two of the M blocks are different. If M is greater than N, there are at least N blocks in the M blocks in the third block stream that correspond to the one block in the fourth block stream, the N blocks are from the N first block streams, and two first block streams corresponding to any two of the N blocks are different.

When the communications device 1301 is configured to perform the solution of the foregoing transmit end, in an optional embodiment, the processor is specifically configured to: for a block in one of the N first block streams, when a synchronization header area of the block is 00, convert the block into the target block; when a synchronization header area of the block is 11, convert the block into the target block; or when a synchronization header area of the block is 10, and a value carried in a type field of the block is an invalid value, convert the block into the target block.

When the communications device 1301 is configured to perform the solution of the foregoing transmit end, in an optional embodiment, the processor is specifically configured to: for the block in the one of the N first block streams, when the synchronization header area of the block is 00 or 11, and the block is located in the middle of a frame, replace a synchronization header of the block with 01; when the synchronization header area of the block is 10, a value carried in a type field of the block is an invalid value, and the block is located in the middle of a frame, replace a synchronization header of the block with 01; when the synchronization header area of the block is 00 or 11, and the block is located in an inter-frame gap, replace the block with an error block; or when the synchronization header area of the block is 10, a value carried in a type field of the block is an invalid value, and the block is located in an inter-frame gap, replace the block with an error block.

In a third embodiment, when the communications device 1301 is configured to perform the solution of the foregoing transmit end, the processor is configured to: obtain N first block streams, where N is a positive integer; interleave the N first block streams, to obtain a fifth block stream; and when there is an invalid block in the fifth block stream, convert the invalid block in the fifth block stream into a target block, to obtain a sixth block stream. The transceiver is configured to send the sixth block stream.

When the communications device 1301 is configured to perform the solution of the foregoing transmit end, in an optional embodiment, a coding format of a first block stream in the N first block streams is a first coding format, a coding format of the fifth block stream is the first coding format, and a coding format of the sixth block stream is the first coding format. The processor is further configured to: convert the coding format of the sixth block stream into a second coding format, to obtain a seventh block stream, where a coding format of the seventh block stream is the second coding format, and the first coding format and the second coding format are different coding formats. The transceiver is specifically configured to send the seventh block stream.

When the communications device 1301 is configured to perform the solution of the foregoing transmit end, in an optional embodiment, the processor is specifically configured to convert M blocks in the sixth block stream into one block in the seventh block stream, where M is an integer greater than 1.

In a fourth embodiment, when the communications device 1301 is configured to perform the solution of the foregoing receive end, in an optional embodiment, the processor is configured to: obtain an eighth block stream; and when there is an invalid block in the eighth block stream, convert the invalid block in the eighth block stream into a target block.

When the communications device 1301 is configured to perform the solution of the foregoing receive end, in an optional embodiment, the processor is specifically configured to: when there is an invalid block in the eighth block stream, convert the invalid block in the eighth block stream into a target block, to obtain a twelfth block stream; de-interleave the twelfth block stream, to obtain N thirteenth block streams; and interleave the N thirteenth block streams and L other block streams, to obtain an interleaved block stream, and send the interleaved block stream by using the transceiver, where L is zero or a positive integer; or perform decoding processing on the N thirteenth block streams by using a physical coding sublayer PCS layer.

When the communications device 1301 is configured to perform the solution of the foregoing receive end, in an optional embodiment, the processor is specifically configured to: de-interleave the eighth block stream, to obtain N ninth block streams; when there is an invalid block in the N ninth block streams, convert the invalid block in the N ninth block stream into a target block, to obtain N tenth block streams; and interleave the N tenth block streams and L other block streams, to obtain an interleaved block stream, and send the interleaved block stream by using the transceiver, where L is zero or a positive integer; or perform decoding processing on the N tenth block streams by using a physical coding sublayer PCS layer.

In a fifth embodiment, when the communications device 1301 is configured to perform the solution of the foregoing receive end, in an optional embodiment, the processor is configured to: obtain an eighth block stream; de-interleave the eighth block stream, to obtain N ninth block streams; when there is an invalid block in the N ninth block streams, convert the invalid block in the N ninth block stream into a target block, to obtain N tenth block streams; and interleave the N tenth block streams and L other block streams, to obtain an interleaved block stream, and send the interleaved block stream by using the transceiver, where L is zero or a positive integer; or perform decoding processing on the N tenth block streams by using a physical coding sublayer PCS layer.

When the communications device 1301 is configured to perform the solution of the foregoing receive end, in an optional embodiment, a coding format of the eighth block stream is a first coding format, and a coding format of the ninth block stream in the N ninth block streams is the first coding format. The transceiver is further configured to receive an eleventh block stream, where a coding format of the eleventh block stream is a second coding format. The processor is further configured to convert the coding format of the eleventh block stream into the first coding format, to obtain the eighth block stream.

When the communications device 1301 is configured to perform the solution of the foregoing receive end, in an optional embodiment, the processor is specifically configured to: for a block in one of the N ninth block streams, when a synchronization header area of the block is 00, convert the block into the target block; when a synchronization header area of the block is 11, convert the block into the target block; or when a synchronization header area of the block is 10, and a value carried in a type field of the block is an invalid value, convert the block into the target block.

When the communications device 1301 is configured to perform the solution of the foregoing receive end, in an optional embodiment, the processor is specifically configured to: for the block in the one of the N ninth block streams, when the synchronization header area of the block is 00 or 11, and the block is located in the middle of a frame, replace a synchronization header of the block with 01; when the synchronization header area of the block is 10, a value carried in a type field of the block is an invalid value, and the block is located in the middle of a frame, replace a synchronization header of the block with 01; when the synchronization header area of the block is 00 or 11, and the block is located in an inter-frame gap, replace the block with an error block; or when the synchronization header area of the block is 10, a value carried in a type field of the block is an invalid value, and the block is located in an inter-frame gap, replace the block with an error block.

In a sixth embodiment, when the communications device 1301 is configured to perform the solution of the foregoing receive end, in an optional embodiment, the processor is configured to: obtain an eighth block stream; when there is an invalid block in the eighth block stream, convert the invalid block in the eighth block stream into a target block, to obtain a twelfth block stream; de-interleave the twelfth block stream, to obtain N thirteenth block streams; and interleave the N thirteenth block streams and L other block streams, to obtain an interleaved block stream, and send the interleaved block stream by using the transceiver, where L is zero or a positive integer; or perform decoding processing on the N thirteenth block streams by using a physical coding sublayer PCS layer.

When the communications device 1301 is configured to perform the solution of the foregoing receive end, in an optional embodiment, a coding format of the eighth block stream is a first coding format, a coding format of the twelfth block stream is the first coding format, and a coding format of a ninth block stream in the N thirteenth block streams is the first coding format. The transceiver is further configured to receive an eleventh block stream, where a coding format of the eleventh block stream is a second coding format. The processor is further configured to convert the coding format of the eleventh block stream into the first coding format, to obtain the eighth block stream.

When the communications device 1301 is configured to perform the solution of the foregoing receive end, in an optional embodiment, the processor is specifically configured to: for a block in the eighth block stream, when a synchronization header area of the block is 00, convert the block into the target block; when a synchronization header area of the block is 11, convert the block into the target block; or when a synchronization header area of the block is 10, and a value carried in a type field of the block is an invalid value, convert the block into the target block.

In the communications device 1301, for positions of converting an invalid block and a coding format, and performing the step of "converting the invalid block into a target block", refer to related descriptions in FIG. 1 to FIG. 11a. Details are not described herein again. For concepts, explanations, detailed descriptions, and other steps of the communications device that are related to the technical solutions provided in embodiments of this application, refer to the descriptions of the content in the foregoing method embodiments or other embodiments. Details are not described herein again.

Figure 14:
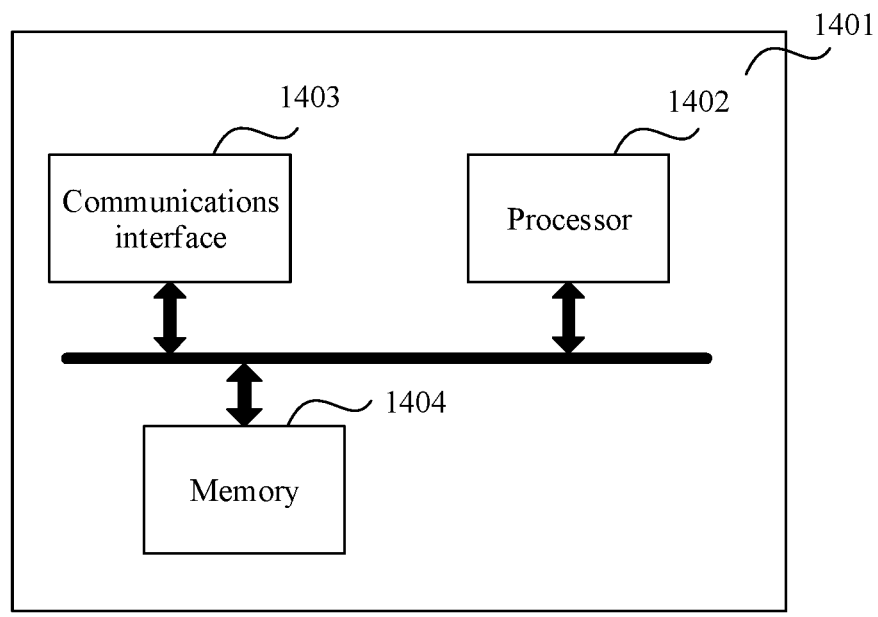
FIG. 14 is a schematic diagram of a structure of another communications device according to an embodiment of this application.

Based on the foregoing methods, FIG. 14 is a schematic diagram of a structure of a communications device 1401 according to an embodiment of this application. As shown in FIG. 14, the communications device 1401 may include a memory 1404, a processor 1402, and a communications interface 1403. The communications interface 1403 is configured to input and/or output information. The processor 1402 is configured to execute a computer program or instructions, so that the communications device 1401 implements the methods of the transmit end and/or the receive end in the related solutions in FIG. 1 to FIG. 12. In this embodiment of this application, the communications interface 1403 may implement the solution implemented by the transceiver 1303 in FIG. 13, the processor 1402 may implement the solution implemented by the processor 1302 in FIG. 13, and the memory 1404 may implement the solution implemented by the memory 1304 in FIG. 13. Details are not described herein again.

Based on the methods provided in embodiments of this application, an embodiment of this application further provides a communications system. The communications system includes the foregoing communications device configured to perform the solution of the transmit end and the foregoing communications device configured to perform the solution of the receive end.

Figure 15:
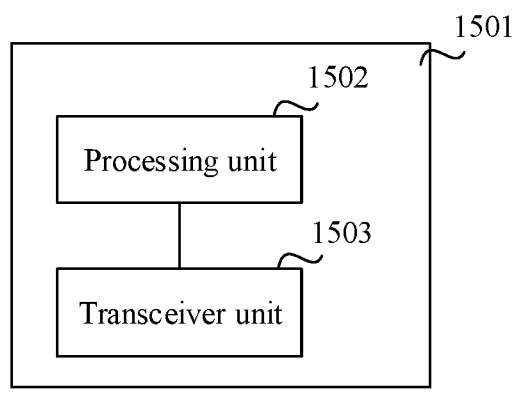
FIG. 15 is a schematic diagram of a structure of another communications device according to an embodiment of this application.

Based on the foregoing embodiments and same concepts, FIG. 15 is a schematic diagram of a communications device 1501 according to an embodiment of this application. As shown in FIG. 15, the communications device 1501 may be a communications device at a transmit end, a communications device at a receive end, or a communications device that can perform the foregoing sending function or the foregoing receiving function. The communications device 1501 may be a network device, or may be a chip or a circuit, for example, a chip or a circuit that may be disposed in a terminal device or a network device.

The communications device may implement steps performed by the transmit end and/or the receive end in the method corresponding to any one or more of FIG. 1 to FIG. 12. The communications device may include a processing unit 1502 and a transceiver unit 1503.

When the communications device 1501 is configured to perform the solution of the foregoing transmit end, in an optional embodiment, the processing unit 1502 is configured to: obtain N first block streams, where N is a positive integer; when there is an invalid block in the N first block streams, convert the invalid block in the N first block streams into a target block, to obtain N second block streams; and interleave the N second block streams, to obtain a third block stream. The transceiver unit 1503 is configured to send the third block stream.

When the communications device 1501 is configured to perform the solution of the foregoing transmit end, in an optional embodiment, the processing unit 1502 is configured to: obtain N first block streams, where N is a positive integer; interleave the N first block streams, to obtain a fifth block stream; and when there is an invalid block in the fifth block stream, convert the invalid block in the fifth block stream into a target block, to obtain a sixth block stream. The transceiver unit 1503 is configured to send the sixth block stream.

When the communications device 1501 is configured to perform the solution of the foregoing receive end, in an optional embodiment, the processing unit 1502 is configured to: obtain an eighth block stream; de-interleave the eighth block stream, to obtain N ninth block streams; when there is an invalid block in the N ninth block streams, convert the invalid block in the N ninth block stream into a target block, to obtain N tenth block streams; and interleave the N tenth block streams and L other block streams, to obtain an interleaved block stream, and send the interleaved block stream by using the transceiver unit 1503, where L is zero or a positive integer; or perform decoding processing on the N tenth block streams by using a physical coding sublayer PCS layer.

When the communications device 1501 is configured to perform the solution of the foregoing receive end, in an optional embodiment, the processing unit 1502 is configured to: obtain an eighth block stream; when there is an invalid block in the eighth block stream, convert the invalid block in the eighth block stream into a target block, to obtain a twelfth block stream; de-interleave the twelfth block stream, to obtain N thirteenth block streams; and interleave the N thirteenth block streams and L other block streams, to obtain an interleaved block stream, and send the interleaved block stream by using the transceiver unit 1503, where L is zero or a positive integer; or perform decoding processing on the N thirteenth block streams by using a physical coding sublayer PCS layer.

For concepts, explanations, detailed descriptions, and other steps of the communications device that are related to the technical solutions provided in embodiments of this application, refer to the descriptions of the content in the foregoing method embodiments or other embodiments. Details are not described herein again.

It may be understood that, for functions of the units in the communications device 1501, refer to the corresponding method embodiments discussed herein. Details are not described herein again.

It should be understood that division into the foregoing units of the communications device is merely logical function division. In embodiments of actual implementation, all or a part of the units may be integrated into one physical entity, or may be physically separated. In this embodiment of this application, the transceiver unit 1503 may be implemented by the transceiver 1303 in FIG. 13, and the processing unit 1502 may be implemented by the processor 1302 in FIG. 13.

Based on the methods provided in embodiments of this application, this application further provides a computer program product. The computer program product includes computer program code. When the computer program code is run on a computer, the computer is enabled to perform the method in any one of embodiments shown in FIG. 1 to FIG. 12.

Based on the methods provided in embodiments of this application, this application further provides a computer-readable storage medium. The computer-readable medium stores program code. When the program code is run on a computer, the computer is enabled to perform the method in any one of embodiments shown in FIG. 1 to FIG. 12.

Based on the methods provided in embodiments of this application, this application further provides a system. The system includes the foregoing communications device at the transmit end and the foregoing communications device at the receive end.

All or a part of the foregoing embodiments may be implemented by software, hardware, firmware, or any combination thereof. When software is used to implement embodiments, all or a part of embodiments may be implemented in a form of a computer program product. The computer program product includes one or more computer instructions. When the computer instructions are loaded and executed on a computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments correspond to the network device or the terminal device in the method embodiments. A corresponding module or unit performs a corresponding step. For example, a communications unit (e.g., a transceiver) performs a receiving step or a sending step in the method embodiments, and a step other than the sending step and the receiving step may be performed by a processing unit (e.g., a processor). For a function of a specific unit, refer to a corresponding method embodiment. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or an execution thread, and a component may be located on one computer and/or distributed between two or more computers. In addition, these components may be executed from various computer-readable media that store various data structures. The components may communicate by using a local and/or remote process and based on, for example, a signal having one or more data packets (for example, data from two components interacting with another component in a local system and/or a distributed system, and/or across a network such as the internet interacting with other systems by using the signal).

A person of ordinary skill in the art may be aware that, various illustrative logical blocks and steps (also referred to as operations) that are described with reference to embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiments are merely examples. For example, division into units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The software product is stored in a storage medium, and includes several instructions for instructing a computer device (which may be a personal computer, a server, or a network device) to perform all or a part of the steps of the methods described in embodiments of this application. The foregoing storage medium includes any medium that can store program code, such as a universal serial bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    obtaining N first block streams at a node of a communications system, wherein N is a positive integer, and wherein the N first block streams are obtained by the node in parallel;
    when an invalid block is detected in a block stream of the N first block streams based at least in part on one or more attributes of the invalid block, converting the invalid block in the block streams into a target block, to obtain N second block streams, the N second block streams comprising the block stream having the target block and N−1 remaining block streams from the N first block streams;
    generating a third block stream by interleaving blocks of the N second block streams; and
    sending the third block stream to a second node of the communications system.

2. The method according to claim 1, wherein a coding format of a first block stream in the N first block streams is a first coding format, a coding format of a second block stream in the N second block streams is the first coding format, and a coding format of the third block stream is the first coding format; and
    the sending the third block stream comprises:
        converting the coding format of the third block stream into a second coding format, to obtain a fourth block stream, wherein a coding format of the fourth block stream is the second coding format, and the first coding format and the second coding format are different coding formats, and
        sending the fourth block stream.

3. The method according to claim 1, wherein when the invalid block detected in the block stream of the N first block streams based at least in part on the one or more attributes of the invalid block, the converting the invalid block in the block streams into the target block comprises:
    for a block in one of the N first block streams:
        when a synchronization header area of the block is 00, converting the block into the target block, or
        when a synchronization header area of the block is 11, converting the block into the target block.

4. The method according to claim 1, wherein when the invalid block detected in the block stream of the N first block streams based at least in part on the one or more attributes of the invalid block, the converting the invalid block in the block streams into the target block comprises:
    for a block in one of the N first block streams:
        when a synchronization header area of the block is 10, and a value carried in a type field of the block is an invalid value, converting the block into the target block.

5. The method according to claim 1, wherein when the invalid block detected in the block stream of the N first block streams based at least in part on the one or more attributes of the invalid block, the converting the invalid block in the block streams into the target block comprises:
    converting the block into the target block when the block meets at least one of the following conditions:
        the block is located in an inter-frame gap and is a data block,
        the block is located in a middle of a frame and is a control block,
        a block adjacent to the block is an idle block, and the block is a data block, and
        a block adjacent to the block is a low-power block, and the block is a data block.

6. The method according to claim 1, wherein the target block comprises a data block and/or an error block.

7. The method according to claim 1, wherein when the invalid block detected in the block stream of the N first block streams based at least in part on the one or more attributes of the invalid block, the converting the invalid block in the block streams into the target block comprises:

for the block in the one of the N first block streams:
when a synchronization header of the block is 00 or 11, and the block is located in a middle of a frame, replacing the synchronization header of the block with 01,
when a synchronization header of the block is 10, a value carried in a type field of the block is an invalid value, and the block is located in a middle of a frame, replacing the synchronization header of the block with 01,
when a synchronization header of the block is 00 or 11, and the block is located in an inter-frame gap, replacing the block with an error block, or
when a synchronization header of the block is 10, a value carried in a type field of the block is an invalid value, and the block is located in an inter-frame gap, replacing the block with an error block.

8. The method according to claim 1, wherein the N first block streams are block streams into which first overhead information is inserted.

9. A communication method, comprising:
obtaining N first block streams at a node of a communications system, wherein N is a positive integer, and wherein the N first block streams are obtained by the node in parallel;
interleaving the N first block streams, to obtain a fifth block stream;
when there an invalid block is detected in the fifth block stream, converting the invalid block in the fifth block stream into a target block, to generate a sixth block stream having the target block; and
sending the sixth block stream to a second node of the communications system.

10. The method according to claim 9, wherein a coding format of a first block stream in the N first block streams is a first coding format, a coding format of the fifth block stream is the first coding format, and a coding format of the sixth block stream is the first coding format; and
the sending the sixth block stream comprises:
converting the coding format of the sixth block stream into a second coding format, to obtain a seventh block stream, wherein a coding format of the seventh block stream is the second coding format, and the first coding format and the second coding format are different coding formats, and
sending the seventh block stream.

11. The method according to claim 9, wherein when the invalid block is detected in the fifth block stream, the converting the invalid block in the fifth block stream into the target block comprises:
for a block in the fifth block stream:
when a synchronization header area of the block is 00, converting the block into the target block, or
when a synchronization header area of the block is 11, converting the block into the target block.

12. The method according to claim 9, wherein when the invalid block is detected in the fifth block stream, the converting the invalid block in the fifth block stream into the target block comprises:

when a synchronization header area of the block is 10, and a value carried in a type field of the block is an invalid value, converting the block into the target block.

13. A communications device, comprising:
a processor configured to:
obtain N first block streams at a node of a communications system, wherein N is a positive integer, and wherein the N first block streams are obtained by the node in parallel;
when an invalid block is detected in a block stream of the N first block streams based at least in part on one or more attributes of the invalid block, convert the invalid block in the block streams into a target block, to obtain N second block streams, the N second block streams comprising the block stream having the target block and N–1 remaining block streams; and
generate a third block stream by interleaving blocks of the N second block streams; and
a transceiver, communicatively coupled with the processor, configured to send the third block stream to a second node of the communications system.

14. The communications device according to claim 13, wherein a coding format of a first block stream in the N first block streams is a first coding format, a coding format of a second block stream in the N second block streams is the first coding format, and a coding format of the third block stream is the first coding format;
the processor is further configured to convert the coding format of the third block stream into a second coding format, to obtain a fourth block stream, wherein a coding format of the fourth block stream is the second coding format, and the first coding format and the second coding format are different coding formats; and
the transceiver is further configured to send the fourth block stream.

15. The communications device according to claim 13, wherein the processor is further configured to:
for a block in one of the N first block streams:
when a synchronization header area of the block is 00, convert the block into the target block, or
when a synchronization header area of the block is 11, convert the block into the target block.

16. The communications device according to claim 13, wherein the processor is further configured to:
when a synchronization header area of the block is 10, and a value carried in a type field of the block is an invalid value, convert the block into the target block.

17. The communications device according to claim 13, wherein the processor is further configured to:
convert the block into the target block when the block meets at least one of the following conditions:
the block is located in an inter-frame gap and is a data block,
the block is located in a middle of a frame and is a control block,
a block adjacent to the block is an idle block, and the block is a data block, and
a block adjacent to the block is a low-power block, and the block is a data block.

18. The communications device according to claim 13, wherein the target block comprises a data block and/or an error block.

19. The communications device according to claim 13, wherein the processor is further configured to:
  for the block in the one of the N first block streams:
    when a synchronization header area of the block is 00 or 11, and the block is located in a middle of a frame, replace the synchronization header area of the block with 01,
    when a synchronization header area of the block is 10, a value carried in a type field of the block is an invalid value, and the block is located in a middle of a frame, replace the synchronization header area of the block with 01,
    when a synchronization header area of the block is 00 or 11, and the block is located in an inter-frame gap, replace the block with an error block, or
    when a synchronization header area of the block is 10, a value carried in a type field of the block is an invalid value, and the block is located in an inter-frame gap, replace the block with an error block.

20. The communications device according to claim 13, wherein the N first block streams are block streams into which first overhead information is inserted.

* * * * *

UNITED STATES PATENT AND TRADEMARK OFFICE
CERTIFICATE OF CORRECTION

PATENT NO. : 11,736,223 B2
APPLICATION NO. : 17/689384
DATED : August 22, 2023
INVENTOR(S) : Li Xu, Qiwen Zhong and Rixin Li It is certified that error appears in the above-identified patent and that said Letters Patent is hereby corrected as shown below:

In the Claims

In Claim 1, Column 42, Line 10, delete "block streams into a target block" and insert --block stream into a target block.--

In Claim 3, Column 42, Line 38, delete "block streams into the target block" and insert --block stream into the target block.--

In Claim 4, Column 42, Line 48, delete "block streams into the target block" and insert --block stream into the target block.--

In Claim 5, Column 42, Line 57, delete "block streams into the target block" and insert --block stream into the target block.--

In Claim 7, Column 43, Line 7, delete "block streams into the target block" and insert --block stream into the target block.--

In Claim 13, Column 44, Line 13, delete "block streams into a target block" and insert --block stream into a target block.--

In Claim 18, Column 44, Line 65, delete "The communications device according to claim 13" and insert --The communications device according to any one of claims 13.--

Signed and Sealed this
Thirty-first Day of October, 2023

Katherine Kelly Vidal
*Director of the United States Patent and Trademark Office*